(12) United States Patent
Morii et al.

(10) Patent No.: US 6,693,751 B2
(45) Date of Patent: Feb. 17, 2004

(54) MEMBER MOUNTING STRUCTURE AND MEMBER MOUNTING APPARATUS

(75) Inventors: Yoshihiro Morii, Tokyo (JP); Shigeru Fujita, Tokyo (JP); Shigeo Kobayashi, Tokyo (JP); Tatsuya Tsuyuki, Tokyo (JP); Hiroshi Takemoto, Tokyo (JP); Jun Ando, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/077,937

(22) Filed: Feb. 20, 2002

(65) Prior Publication Data

US 2002/0114086 A1 Aug. 22, 2002

(30) Foreign Application Priority Data

Feb. 20, 2001 (JP) ......................... 2001-043723

(51) Int. Cl.[7] ................ G02B 7/02; G03B 17/26; G03B 21/14; F21V 17/00
(52) U.S. Cl. .................. 359/819; 359/811; 396/526; 362/455; 353/100
(58) Field of Search ................ 359/819, 811, 359/822, 813, 818, 820, 821; 396/526; 362/455; 353/100; 358/474, 1.5, 315, 255, 432, 433

(56) References Cited

U.S. PATENT DOCUMENTS

| 4,493,573 A | 1/1985 | Hashimoto et al. ....... 400/647.1 |
| 4,795,284 A | 1/1989 | Yumoto et al. .............. 400/352 |
| 4,846,595 A | 7/1989 | Kato et al. ................... 400/320 |
| 5,358,165 A | 10/1994 | Andoh ........................ 228/4.1 |
| 6,000,784 A | 12/1999 | Takemoto et al. ............ 347/50 |
| 6,127,012 A | 10/2000 | Nagatsuna et al. ........ 428/40.1 |
| 6,217,684 B1 | 4/2001 | Morii et al. .................. 156/44 |
| 6,224,709 B1 * | 5/2001 | Takemoto et al. ....... 156/275.5 |
| 6,424,434 B1 * | 7/2002 | Uchida ........................ 358/474 |

FOREIGN PATENT DOCUMENTS

| JP | 7-297993 | 11/1995 |
| JP | 10-309801 | 11/1998 |

* cited by examiner

*Primary Examiner*—Hung Xuan Dang
*Assistant Examiner*—Joseph Martinez
(74) *Attorney, Agent, or Firm*—Oblon, Spivak, McClelland, Maier & Neustadt, P.C.

(57) ABSTRACT

Disclosed is a member mounting structure and a member mounting apparatus for mounting a member such as a solid state image input unit in which mounting of the solid state image input unit can be achieved with high accuracy after positioning adjustment along five axes, yield of production can be increased, and at the same time, decrease of fixing force of the solid state image input unit after production (after adhesive material has been hardened) does not occur by means that positioning adjustment of the solid state image input unit along five axes is easily performed before adhering and fixing of the solid state image input unit. An intermediate holding member is disposed between a frame and the solid state image input unit so that a first adhered surface between the frame and the intermediate holding member, and a second adhered surface between the solid state image input unit and intermediate holding member are arranged parallely with pixel lines and at the same time, the first adhered surface and second adhered surface are arranged to make a right angle.

8 Claims, 30 Drawing Sheets

(b)

PARALLEL

OPPOSING

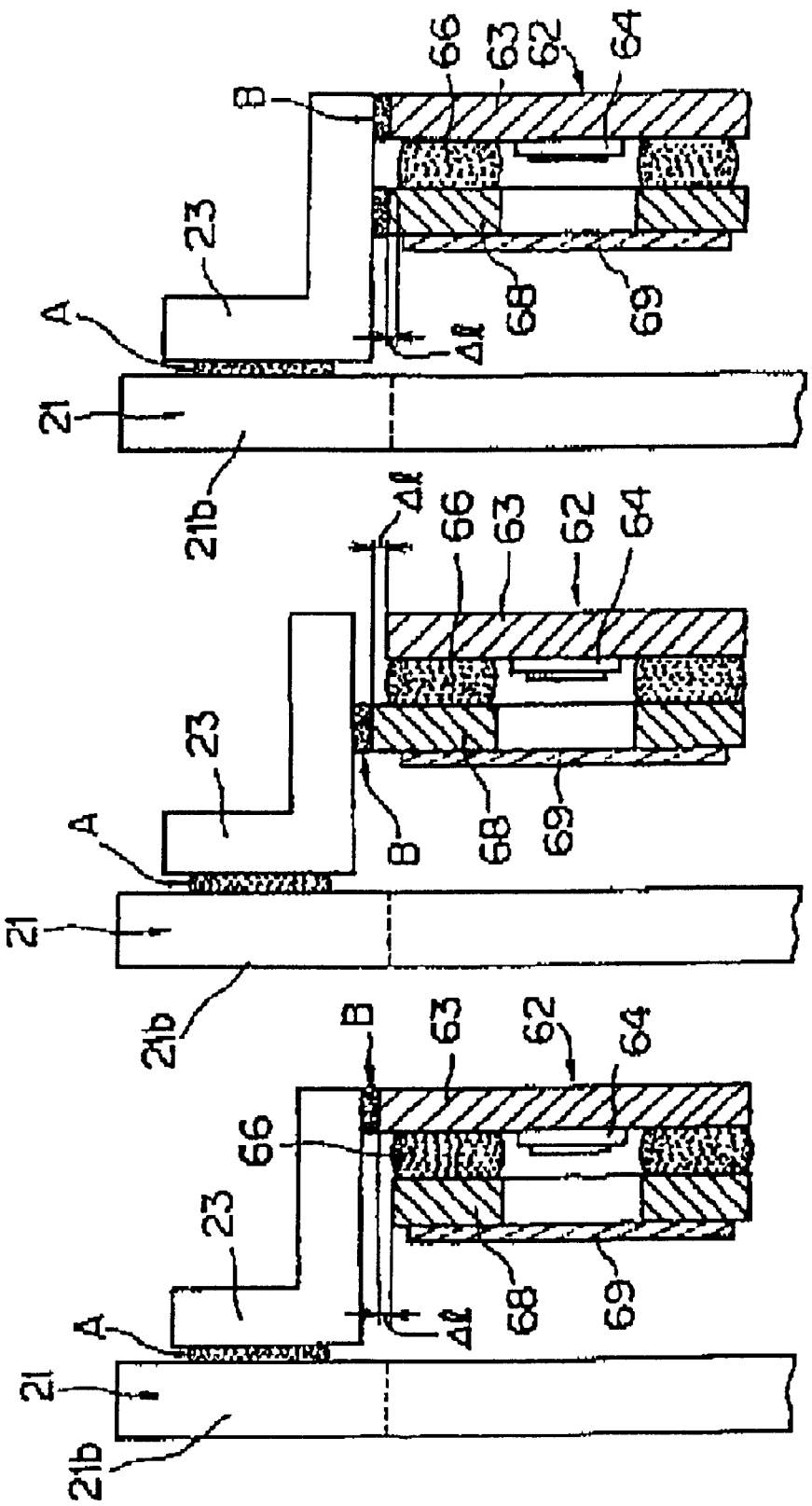

MEMBER MOUNTING STRUCTURE AND MEMBER MOUNTING APPARATUS

FIELD OF THE INVENTION

The present invention relates to a member mounting structure and a mounting apparatus for mounting a member such as a solid state image input unit, more specifically, relates to a member mounting structure and a member mounting apparatus for mounting a member such as a solid state image input unit utilized in copying machine, facsimile machine, image scanner and so on, in which an optical image is read by utilizing the solid state image input unit.

BACKGROUND OF THE INVENTION

Generally, an image forming apparatus in which optical image is input as optical signal using a solid state image input unit such as CCD, inputs image of object 1 focused on solid state image input unit 3 through image forming lens unit 2 as shown in FIG. 46. In the solid state image input unit 3, one line of the solid state image input unit is utilized in which plurality of micro photoelectric converting devices (hereinafter it is referred to as merely "pixel", which usually has a small dimension of some micrometers square) are arranged in a straight line.

In the image input unit as above described, in order to arrange a line image which is focused by the image forming lens unit 2, on the solid state image input unit and at the same time, in order to read out optical characteristics (focus, magnification and so on) in a predetermined accuracy level, it is required that the image forming lens unit 2 and the pixel line 4 of a line of solid state image input unit 3 are adjusted their position by micro movement along three axis directions such as X, Y and Z axes, and around two rotational directions such as β rotation around Y axis and γ rotation around Z axis (hereafter rotational directions around the two axes referred merely to as movements along axes such as β axis and γ axis, and X, Y, Z, β and γ axes are merely referred to as five axes.) as shown in FIG. 47. At this time, the reference numeral 5 in FIGS. 46, 47 designates an axis of the lens unit 2.

At this point, the reason why an adjustment around X axis is not performed is that the distances between the image forming lens unit 2 and respective pixels of the solid state image input unit 3, become not different even when the adjustment along the X axis is not performed, because the X axis is located along (in parallel to) a direction of the line of pixels, in comparison with that the adjustments around the β and γ axes cause the accuracy of optical characteristics to deteriorate because the distances between the image forming lens unit 2 and respective pixels of the solid state image input unit 3 become different when the adjustment around the β axis and γ axis are not performed.

In the mean time, in order to input colored images there is a case in that the solid state image input unit 6 in which pixel R(6a), B(6b) and G(6c) having a peak of the spectroscopic sensitivity in Red (hereinafter referred to as merely "R"), Green (hereinafter referred to as merely "G") and Blue (hereinafter referred to as merely "B") respectively, are arranged in three lines respectively, is used as shown in FIG. 48.

Usually, accurate positioning adjustment of such solid state image input unit 6 is requested in high precision for every five dimension respectively, and what is seemed to be indispensable to attain the request is a technology by which positional discrepancy of positioning of solid state image input unit 6 is not happened when the solid state image input unit 6 is fixed onto a frame after the position of solid state image input unit 6 is adjusted as above stated.

The reason why such technology is requested is because even the positioning has been adjusted with high precision, when positional discrepancy happens at fixing, positioning adjustment must be performed again or separable members must be scraped in case of the fixing method in which parts are not separable.

To solve this kind of inconvenience it may take into consideration that complicated structural parts composed with arrowheads, balls and springs instead of screws are utilized, however, the cost increases much more because the complicated structural parts are expensive.

Accordingly, at present a fixing by adhesive material is mainly tried which is thought that amount of positional discrepancy is much less than that by screws and that problem regarding to number of members is much less. There are two methods in the fixing by adhesive material when it is classified roughly, one is a method for the case that objects to be fixed together are contacting each other, and another is a method for the case that objects to be fixed together are not contacting with a space.

At this time, the former is called as contacting adhering method and the latter is called as caulking adhering method.

In the caulking adhering method, there is a space which is larger than that for an adjusting, and the adhesive material is introduced and filled the space in order to fix the space. As a prior art technology of this kind in the caulking adhering method, there is a technique disclosed, for example, in Japanese Patent Laid Open Hei 7 (1995)-297993. The technology settles the space between the objects to be adhered so that the objects to be adhered would not contact each other even when they have problem of accuracy in shape and size and the adhesive material is filled between the space to fix.

Also, as a mounting method onto a head holding member through an ultraviolet curing adhesive material, there is a method as shown in FIG. 49.

In the method shown in FIG. 49, the adhesive material 12 is painted on one surface of a work piece 11 and the work piece 11 is adjusted for its positional relation to a work piece holding member 13 as shown in FIG. 49(A). When the work piece 11 is fixed onto the work piece holding member 13 through the adhesive material 12, by irradiating ultraviolet to the adhesive material 12 through a light guide L from a space between the work piece 11 and the work piece holding member 13, the adhesive material 12 is hardened to fix the work piece 11 onto the work piece holding member 13 as shown in FIG. 49(B). At this time, when either one of the work piece 11 or the work piece holding member 13 is made of a ultraviolet transparent material, the ultraviolet may be passed through the transparent material to irradiate the adhesive material 12.

However, in the prior art technique such as described above, because the amount of space is settled so that the objects to be fixed would not contact each other and the adhesive material is filled between the space to fix, problems as listed below have taken place.

Hereinafter, this caulking adhering method will be explained with reference to a drawing of one example as shown in FIG. 50, and the problems of it will be concretely explained.

In FIG. 50, the reference numeral 14 designates a work piece to be adhered, 15 designates a work piece holding member and 16 designates the adhesive material, the work piece 14 will be fixed onto the work piece holding member 15 by caulking the adhesive material 16 between the work piece 14 and the work piece holding member 15 and hardened in this example.

To adhere and fix the work piece 14 on the work piece holding member 15 without contacting each other, a space B is required in order to keep a space to be filled by the adhesive material 16 so that the adhered surface 14a of work piece 14 and the adhered surface 15a of work piece holding member 15 would not contact each other even when an amount of dispersion in positional discrepancy is A (space for positioning adjustment of the work piece 14) at the adhered surface 14a of work piece 14, and an amount of dispersion in positional discrepancy C at the adhered surface 15a of work piece holding member 15, occur.

In consequence of this, the film thickness of adhesive material 16 varies from B at the minimum and to A+B+C at the maximum, then it becomes dispersing in a range A+C.

Further, it may also become dispersing in a range I+J because of influence of a surface accuracy in the adhered surface 14a of work piece 14 and the adhered surface 15a of work piece holding member 15.

Generally, as the adhesive material shrinks when it is hardened, it becomes important that the film thickness of adhesive material must be reduced as little as possible in order for the objects to be fixed not to have the positional discrepancy after the adhesive material has been hardened. On the contrary, as the film thickness of adhesive material cannot be made less than B in the above described caulking adhering method, there was a case in that an improvement in the amount of positional discrepancy after fixing, could not be realized because changing of film thickness as a counter measure could not be applied even the positional discrepancy happened with amount much larger than the tolerable amount when the film thickness of adhesive material is B.

Because a dispersion of the film thickness happens within a range of A+C, the amount of shrinkage at the adhesive material after fixing, changes together in accordance with the dispersion. In consequence of this, the position of work piece 14 also disperses and there was a case in that the required accuracy could not be maintained. Commonly the volume shrinkage rate of ultraviolet curing adhesive material is in a range from 5 to 10 percent. Presuming a case that the volume shrinkage rate is 7%, it shrinks about 2% in each respective three directions when the hardening shape of adhesive material is cubic.

In consequence of this, when the difference in a level of about 0.5 mm occurs in the film thickness of adhesive material, it causes that about 10 μm of differences in the shrinkage after hardened, occur in respective directions. In a case when the objects to be fixed are made by an injection molding of the resin, there can be a case in that above described dispersion of film thickness A+C becomes more than 0.5 mm, there is enough possibility that the positional discrepancy becomes a fatal problem.

As above described, because there may happen a case that the required accuracy of fixing position for an ink jet work piece is not maintained by the prior caulking adhering method, a yield in production line is made decreased or there must be a disposal for scrapping of the objects fixed, which is not good in accuracy of fixing, then they makes problem happened that costs for production are increased.

To solve this kind of problems, there is a technique disclosed in Japanese Laid Open Patent Hei 10(1998)-309801.

This member mounting structure is arranged in that lying an intermediate holding member between a work piece and a work piece holding member and then fixing the intermediate holding member onto the work piece by an adhesive material and at the same time, fixing the intermediate holding member onto the work piece holding member through the adhesive material. Because of this lying structure of the intermediate holding member between the work piece and the work piece holding member, by means of only controlling to make minimum for necessity and constant the film thickness of the adhesive materials those are used for a space between the adhered surfaces of the work piece and the intermediate holding member, and used for a space between the adhered surfaces of the work piece holding member and the intermediate holding member, this technology can achieve to attach the work piece onto the work piece holding member with high accuracy, and to keep high yield of production and at the same time, to prevent occurrence of decease in fixing force of the work piece after production without controlling the positional accuracy of adhering point of the work piece and the work holding member.

However, the above described technique has still problem to be improved when it is applied to a case that a solid state image input unit is the work piece and a solid state image input unit holding member is the work piece holding device and an intermediate holding member is lying through adhesive material between the solid state image input unit and the work piece holding member, because it has not a concrete structure in order to enable the high accuracy attachment of the solid state image input unit after the easy positioning adjustment in five axes of the solid state image input unit, in the positioning adjustment of the solid state image input unit before fixing by the adhesive material, a line image focused by an image forming lens unit is positioned on the solid state image input unit and an optical characteristics of them are measured with a required predetermined accuracy, and to prevent an occurrence of decrease in fixing force of the solid state image input unit after production.

In consequence of this, it is an object of the present invention to provide a mounting structure for mounting a solid state image input unit by which mounting of the solid state image input unit is enable to easily achieve a positioning adjustment in the five axes of the members of solid state image input unit with high accuracy after positioning adjustment has done in the five axes before fixing the solid state image input unit by adhesive material, and an image data input unit and an image forming apparatus which are made with the mounting structure.

SUMMARY OF THE INVENTION

In consequence of this, it is an object of the present invention to provide a mounting structure for mounting a solid state image input unit by which mounting of the solid state image input unit is enable to easily achieve a positioning adjustment in the five axes of the members of solid state image input unit with high accuracy after positioning adjustment has done in the five axes before fixing the solid state image input unit by adhesive material, and an image data input unit and an image forming apparatus which are made with the mounting structure.

To solve the above stated object, according to a first aspect of the present invention, a member mounting structure comprises: a first member; a second member on which a plurality of acting members are disposed along a line; and an intermediate holding member for holding the second member so as to oppose to the first member. The first member and the intermediate holding member are fixed by adhesive material; and at the same time, the second member and the intermediate holding member are fixed by adhesive material. The intermediate holding member is disposed so that a first adhered surface between the first member and the intermediate holding member, and a second adhered surface between the second member and the intermediate holding member are arranged parallely with the disposed direction of the plurality of acting members and at the same time, the first and second adhered surfaces are arranged to make a right angle.

In the structure when a positioning adjustment of the first member 101 and the second member 102 is performed, a positioning adjustment along X, Y and γ axes can be achieved by means that intermediate holding member 103 is slid parallely with reference to the adhered surface of the first member 101, and a positioning adjustment along X, Z and β axes can be achieved by means that second member 102 is slid parallely with reference to the adhered surface of the intermediate holding member 103. As a result of this, the positioning adjustment with micro movement along only five direction of X, Y, Z, β and γ axes except around X axis, can be easily achieved.

In other words, by means that the first adhered surface A between the first member 101 and the intermediate holding member 103, and the second adhered surface B between the second member 102 and the intermediate holding member 103 become parallel with the direction in which plurality of acting members of the second member 102 are disposed, and at the same time, the first adhered surface A and the second adhered surface B are arranged to make a right angle, the positioning adjustment in direction along only five axes of X, Y, Z, β and γ can easily be adjusted so that the positioning adjustment along the X axis is not achieved in positive manner.

At this time, the reason why an adjustment of rotational axis around X axis is not performed is that the distances between the first member and the second member become not different without adjustment around X axis even when the adjustment around the X axis is not performed, because the X as is located along (in parallel to) a direction of the line of the acting members in comparison with that the adjustments around the β axis and γ axis cause deteriorate the accuracy of optical characteristics because the distances between the first member and the second member become different when the adjustment of the β axis and γ axis around the Y axis and Z axis are not performed.

After the positioning adjustment along five axes is completed the mounting of the second member is performed with high precision and yield of the process can get higher by means that thickness of the adhesive materials which are applied to the adhered surface between the second member and the intermediate holding member and the adhered surface between the first member and the intermediate holding member are controlled in the minimum requirement and constant value, and a positional accuracy of the adhered portions of second member and the first member do not have to be strictly controlled because the intermediate holding member is equipped between the second member and the first member, and at the same time, it can be prevented that an occurrence of deterioration in a fixing forth of the second member after the second member has been completed (after the adhesive material is hardened).

To solve the above stated object, according to a second aspect of the present invention, a mounting structure according to the first aspect wherein said second member comprising a disposing member on which said acting members are disposed, a substrate on which said disposing member is mounted, and a supporting member for attaching and detaching to support detachably said substrate, is provided is provided.

In such case, the second member can be ritualized again because the second member can be removed from the detachable supporting member when defective product in adhesion is made in mounting process at the first adhered surface or the second adhered surface or at both adhered surfaces.

To solve the above stated object, according to a third aspect of the present invention, a mounting structure according to first aspect of invention wherein said second member comprising a disposing member on which said acting members are disposed, and a supporting member for attaching and detaching to support detachably said substrate is provided.

In such case, the second member can be ritualized again because the second member can be removed from the detachable supporting member when defective product in adhesion is made in mounting process at the first adhered surface or the second adhered surface or at both adhered surfaces.

Also to achieve the above stated object, according to a fourth aspect of the present invention, a mounting structure according to the first aspect of the present invention wherein said structure further comprising a substrate on which said second member is mounted, and said substrate has a through hole to be penetrated by a part of said intermediate holding member when said second member is fixed on said intermediate holding member is provided.

In such case in positioning adjustment for the second adhered surface, the accurate positioning adjustment can be achieved when positioning adjustment of longer distance is required than a thickness of the second member and a width of space between the second member and the substrate on which the second member is mounted, because a longer adjustment space can be secured in Z direction by means that the second adhered surface is extending in direction of Z axis.

Further to achieve the above stated object, according to a fifth aspect of the present invention, a mounting structure according to the first aspect of the present invention wherein said structure further comprising a substrate on which said second member is mounted, and said second member is arranged so that said substrate does not abut on a part of said intermediate holding member when said second member is moved in a direction toward said first adhered surface to be fixed on said intermediate holding member is provided.

In such case in positioning adjustment for the second adhered surface, the accurate positioning adjustment can be achieved when positioning adjustment of longer distance is required than a width of the second member and a length of space between the second member and the substrate on which the second member is mounted, because a longer adjustment space can be secured in Z direction by means that the second adhered surface is extending in direction of Z axis.

Still further to achieve the above stated object, according to a sixth aspect of the present invention, a mounting structure according to claim 1 wherein said first member has a adjusting member to adjust a distance between opposing surfaces of said first member and said second member is provided.

In such case when the positioning adjustment cannot be completed by only a positioning adjustment of the second member, the accurate positioning adjustment can be achieved because the positioning adjustment for first member and second member can be achieved in Z direction.

Yet further to achieve the above stated object, according to a seventh aspect of the present invention, a mounting structure according to first aspect of the present invention wherein said first adhered surface crossed with an optical axis with right angle and a height of the optical axis is located between a width of said first adhered surface in vertical direction is provided.

In such a case a shrinkage at the intermediate holding member is transformed to a movement to come nearer (a slide) to the first member and the second member with regard to an effect of hardening age which occurs at a hardening of the adhesive material, the positional discrepancy at the second member itself can be suppressed and the first member can be located with high accuracy in relation to the second member.

Moreover, the whole structure can get a micro movement to adjust its position along the respective five directions of X, Y, Z, β and γ axes by means that sliding adjustments are performed in the two surfaces being right angle each other (the first adhered surface A and the second adhered surface B).

Further again, the whole parts of structure can be contained in the minimum required space and occurrence of a restriction for the layout can be prevented because the first adhered surface and the second adhered surface can be included within the vertical range with the fundamental restricted area on the layout by means that the first adhered surface and the optical axis are located in the same height when viewing along the X direction.

According to a eighth aspect, the present invention is characterized by that plurality of said intermediate holding member are disposed and at least a pair of said intermediate holding member hold together said second member.

In such case, the structure can be much stronger to the external force and the mechanical vibration than a structure with the same number of intermediate holding member which are located all the same side.

Yet further to achieve the above stated object, according to a ninth aspect of the present invention, a mounting apparatus having members with a structure according to the first aspect of the present invention in which said first member is a holding member to hold a image forming lens unit, said second member is solid state image input unit which photoelectric converting image focused by said image forming lens unit, said apparatus comprising: a light source; an image for positioning adjustment illuminated by said light source for generating image to perform positioning adjustment of said solid state image input unit; and a fixing operation portion holding members having said structure according to claim 1 performing positioning adjustment of image forming lens unit and solid state image input unit and fixing them, wherein said image for positioning adjustment is focused on said solid state image input unit through image forming lens unit, and calculating relative position of image forming lens unit and solid state image input unit based on photoelectric converted focused data is provided.

In such case, the positioning adjustment can be accurately achieved even when the fluctuation of conjugate length happens at the image forming lens unit because a width can be set to adjust the width of error along Z axis.

BRIEF DESCRIPTION OF THE DRAWINGS

Hereinafter embodiments of the present invention will be described with reference to the drawings attached.

FIG. 17s are views to show the combined relation of a frame, an intermediate holding member and the solid state image input unit utilized in a seventh embodiment according to the present invention.

FIG. 13(a) shows before a deformation begins and FIG. 13(b) shows after the deformation began.

FIG. 13(a) shows before a deformation begins and FIG. 13(b) shows after the deformation began.

FIG. 55s are cross sectional views to show one example of mounting structure of the CerDIP type solid state image input unit according to a seventeenth embodiment of the present invention, FIG. 55(a) shows an example of a case in which a base protrudes from other portions, FIG. 55(b) shows an example of a case in which a wind frame protrudes from other portions, and FIG. 55(c) shows an example of case in which the base and the wind frame protrude with constituting a surface from other portions.

DETAILED DESCRIPTION OF THE PREFERRED EMBODIMENTS

Hereinafter the preferred embodiments of the present invention will be described in detail with reference to the accompanied drawings.

First Embodiment

Figure 2:
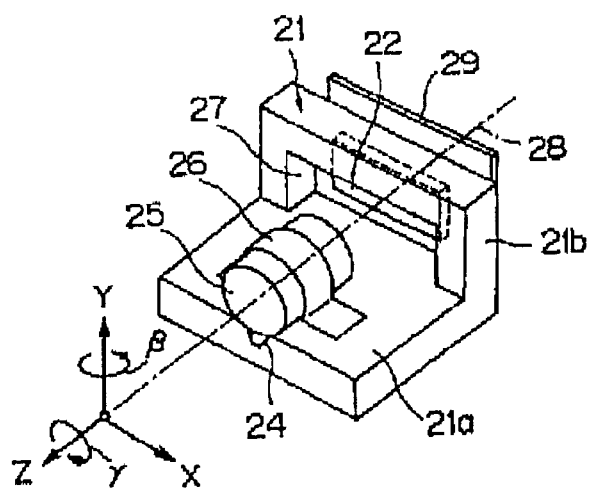
FIG. 2s are perspective view (a) and elevation view (b) to show a first embodiment of the mounting structure for members of solid state image input unit according to the present invention.
Figure 2:
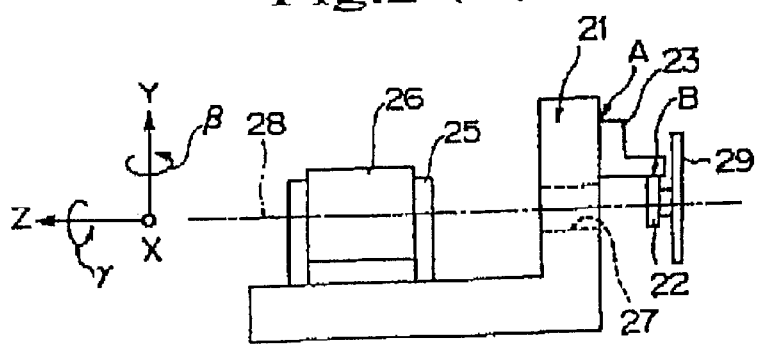
Figure 3:
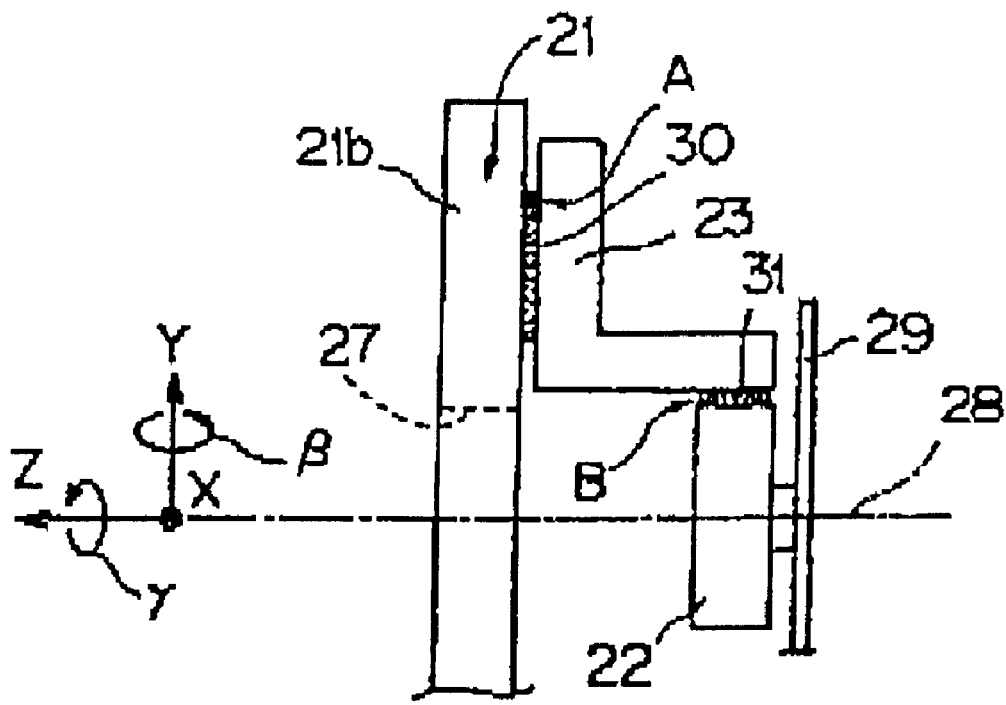
FIG. 3(a) is a elevation view to show the combined relation of a frame, an intermediate holding member and the solid state image input unit utilized in the first embodiment.
FIG. 3(b) is a rough sketch of front view of the solid state image input unit.
Figure 3:
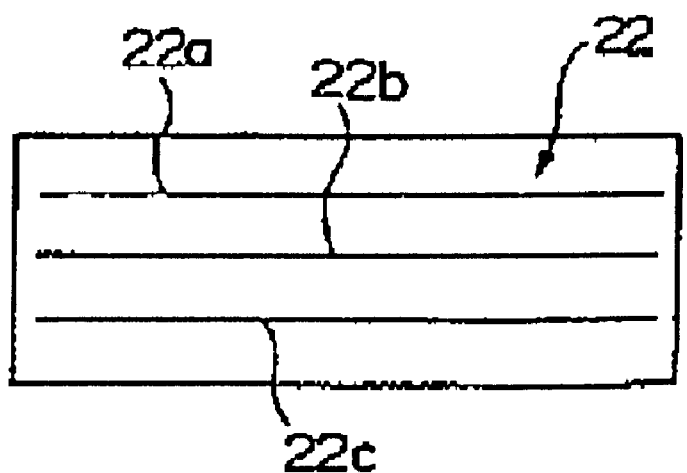
Figure 4:
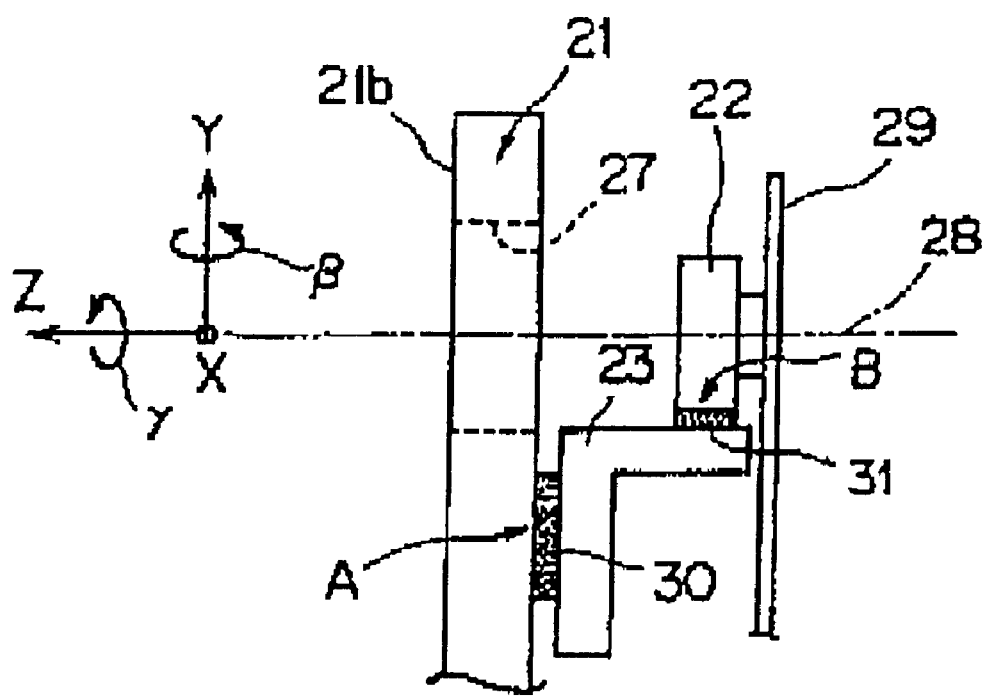
FIG. 4(a) is a elevation view to show another combined relation of the frame, the intermediate holding member and the solid state image input unit utilized in the first embodiment.
FIG. 4(b) is a elevation view of an intermediate holding member with another shape.
Figure 4:
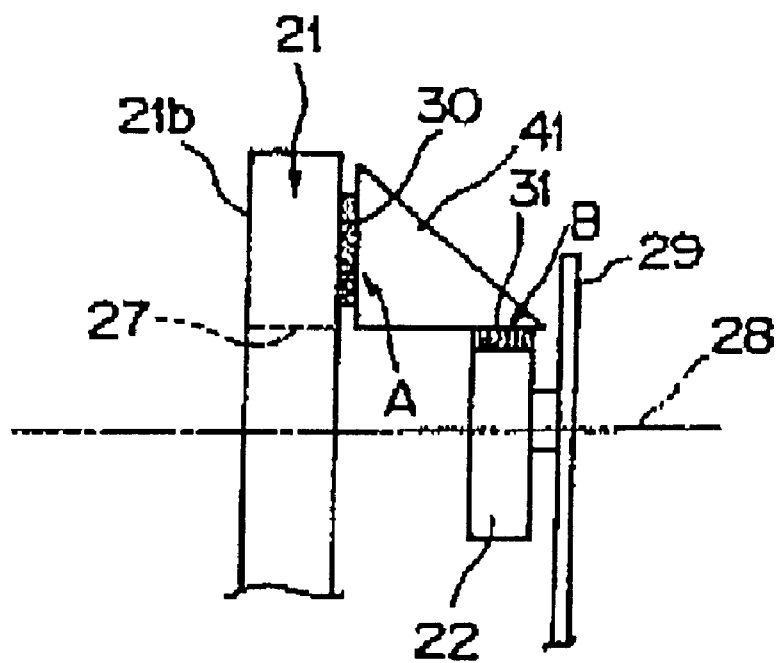

FIGS. 2–4 are views to show a first embodiment of the mounting structure for members and a mounting apparatus for members according to the present invention, this mounting structure for members can be applied to the image read out apparatus such as a copying machine, a facsimile machine, an image scanner and so on, and the image forming apparatus such as printing apparatus and so on.

Firstly, a configuration will be explained. In FIGS. 2 and 3, a reference numeral 21 denotes a frame, which is formed in letter "L" shape and is composed of a horizontal portion 21a and a vertical portion 21b, the frame 21 constitutes a first member according to the present invention.

A V shaped ditch 24 is formed on the horizontal portion 21a and an image forming lens unit 25 is located on the V shaped ditch 24. The image forming lens unit 25 is made to form an image of document on respective pixel lines 22a, 22b, 22c composed by respective solid state image input unit 22 which is combined photoelectric converting devices such as CCD aligned in every RGB respectively separated, and the lens unit is fixed on the horizontal portion 21a by a lens fixture 26.

An aperture portion 27 is formed in the vertical portion 21b, and the aperture portion 27 is made to guide line images converged by the image forming lens unit 25 to the respective pixel lines 22a, 22b, 22c of the solid state image input unit.

In the solid state image input unit 22, the pixel lines 22a, 22b, 22c composed with the photoelectric converting devices, are aligned in lines, and the solid state image input unit 22 is held so as for the pixel lines 22a, 22b, 22c to face to the image forming lens unit 25 by an intermediate holding member 23. The solid state image input unit 22 and the pixel lines 22a, 22b, 22c constitute respectively a second member and operating member according to the present invention.

At this point, in FIGS. 2 and 3 a reference numeral 28 denotes an axis of lens unit, and it corresponds to a Z axis of the coordinate utilized in this system. Also, X axis direction extends along a main scanning direction of the image read out apparatus, and Y axis direction extends along a secondary scanning direction.

Further, a circuit board 29 is attached to the solid state image input unit 22, the circuit hoard 29 processes electric output signal from the solid state image input unit 22 according to the focused optical image and output it to an image readout apparatus while driving the solid state image input unit 22.

In the mean time the intermediate holding member 23 is formed to be an L shaped of a material through which ultraviolet can pass. The intermediate holding member 23 is fixed on the vertical portion 21b and the solid state image input unit 22 respectively by an ultraviolet curing adhesive material 30, 31. The intermediate holding member 23 is arranged between the vertical portion 21b and the solid state image input unit 22 so that an adhered surface A between the vertical portion 21b and the intermediate holding portion 23 (hereafter referred to as a first adhered surface) and an adhered surface B between the solid state image input unit 22 and the intermediate holding member 23 (hereafter referred to as a second adhered surface) become surfaces parallel to the pixel line 22a, 22b, 22c and at the same time, the first adhered surface and the second adhered surface become a right angle direction.

Hereinafter positioning adjustment method for the solid state image input unit 22 will be described.

Adhesive material 30, 31 is painted by a solid state image input unit mounting apparatus (not shown) on the two surfaces A and B of the intermediate holding member which cross at right angle each other. At this moment, after thickness of the adhesive material 30, 31 is monitored and adjusted by a camera (not shown) so that the thickness of the adhesive material become constant, the intermediate holding member 23 is attached onto the vertical portion 21b and at the same time, the solid state image input unit 22 is attached to the intermediate holding member 23 by the mounting apparatus.

Then, a line image focused by the image forming lens unit 25 is located on the solid state image input unit 22, and at the same time, operations to read out the optical characteristics (focus, magnification and so on) with a predetermined accuracy is performed. At this moment the positioning adjustment of solid state image input limit 22 is achieved while the data of optical characteristics which are transformed through photoelectric conversion by the solid state image input unit 22 are monitored.

At first, when in a case to achieve positioning adjustment along X axis direction, the solid state image input unit 22 is held grippingly by a chuck and so on so that the solid state image input unit 22 is made to slide on the adhesive material 31, and positioning adjustment is achieved. In this case, a slidable portion at the adjusting operation occurs at only one due to a difference of surface tension because an adhered surface area of the adhesive material 31 is small in comparison with that of the adhesive material 30 as shown in FIG. 3(a).

However, when the adjusting operation along X axis direction is performed, it is no problem that both of the intermediate holding member 23 and the solid state image input unit 22 make sliding motions the adhesive material 30.

Further, when in a case to achieve positioning adjustment on β axis around Y axis, the solid state image input unit 22 is held grippingly by a chuck and so on so that the solid state image input unit 22 is made to slide on the adhesive material 31.

Also, when in a case to achieve positioning adjustment along Y axis direction, the intermediate holding member 23 is held grippingly by a chuck and so on so that both of the solid state image input unit 22 and the intermediate holding member 23 are made to slide at the same time, on the adhesive material 30.

In addition, when in a case to achieve positioning adjustment along Z axis direction, the solid state image input unit 22 is held grippingly by a chuck and so on so that the solid state image input unit 22 is made to slide at the same time, on the adhesive material 31.

More over, when in a case to achieve positioning adjustment on γ axis around Z axis, the intermediate holding member 23 is held grippingly by a chuck and so on so that the solid state image input unit 22 and the intermediate holding member 23 are made to slide on the adhesive material 30.

In this embodiment the respective motions of X, Y, Z, β and γ can be independently performed for every axis, and the sliding motions to adjust the intermediate holding member 23 and the solid state image input unit 22 can be agreed with the Cartesian coordinate direction because the intermediate holding member 23 is arranged between the frame 21 and the solid state image input unit 22 so that the first adhered surface A and the second adhered surface B crosses at right angle.

At this time, the reason why an adjustment of rotational axis around X axis is not performed is that the distances between the image forming lens unit 25 and respective pixels of the solid state image input unit 22 become not different without adjustment around X axis even when the adjustment around the X axis is not performed, because the X axis is located along (in parallel to) a direction of the line of pixels 22a–22c in comparison with that the adjustments around the β axis and γ axis cause deteriorate the accuracy of optical characteristics because the distances between the image forming lens unit 25 and respective pixels of the solid state image input unit 22 become different when the adjustment of the β axis and γ axis around the Y axis and Z axis are not performed.

As described above, the positioning adjustment of solid state image input unit 22 is performed and when a judgment that the optical characteristics get satisfied a level within the predetermined accuracy, has been made through output from the monitor, the adhesive materials 30, 31 are hardened all at once with an irradiation of the ultraviolet though the immediate holding member 23 from vertical directions to the surfaces to be adhered at all area to be adhered of the adhesive materials 30, 31, by an ultraviolet irradiating light (not shown).

As described above, in this embodiment because the intermediated holding member 23 is arranged between the vertical portion 21b and the solid state image input unit 22 so that the first adhered surface A and the second adhered surface B are parallelized with the pixel line 22a–22c of solid state image input unit 22 and at the same time, the first adhered surface A and the second adhered surface B are squared together in their directions, the positioning adjustment in direction along three axes of X, Y, and γ can be achieved by means that the intermediate holding member 23 is slid in parallel with the adhered surface of frame 21 before the solid state image input unit 22 is adhered and fixed, and the positioning adjustment in direction along three axes of X, Z, and β can be achieved by means that the solid state image input unit 22 is slid in parallel with the adhered surface of intermediate holding member 23. As a result of this, the positioning adjustment as micro movement only along the five direction of X, Y, Z, β and γ axes can be easily achieved other than a direction around X axis.

In other words, by means that the intermediate holding member 23 is arranged so that the first adhered surface A between frame 21 and intermediate holding member 23, and the second adhered surface B between solid state image input unit 22 and intermediate holding member 23 are parallelized with the pixel lines 22a–22c of solid state image input unit 22 and at the same time, the first adhered surface A and the second adhered surface B are squared together in their directions, the positional arrangement in direction along only five axes of X, Y, Z, β and γ can easily be adjusted so that the positioning adjustment along the X axis is not achieved in positive manner.

In addition, after the positioning adjustment along five axes is completed the mounting of solid state image input unit 22 is performed with high precision and yield of the process can get higher by means that thickness of the adhesive materials 30, 31 which are applied to the first adhered surface A and the second adhered surface B are controlled in the minimum requirement and constant value, and a positional accuracy of the adhered portions of solid state image input unit 22 and frame 21 do not have to be strictly controlled because the intermediate holding member 23 is equipped between the solid state image input unit 22 and the frame 21, and at the same time, it can be prevented that an occurrence of deterioration in a fixing forth of the solid state image input unit 22 after the solid state image input unit has been completed (after the adhesive material is hardened).

A time required to harden the adhesive materials 30, 31 can be shortened and a productivity can be increased because the adhesive material 30, 31 are selected from ultraviolet curing adhesive materials and the intermediate holding member 23 is made of a material which can pass ultraviolet through so that the ultraviolet can be irradiate onto the ultraviolet adhesive material through the intermediate holding member 23, and the ultraviolet can be irradiated all at once onto all of the adhered surfaces through the intermediate holding member 23 from vertical directions.

At this point, the thickness of adhesive material 30, 31 are the thinner the better in order to decrease an influence of the shrinkage when hardened. However, it actually happens a necessity that the thickness are arranged to cover a difference between concavity and convexity of the surface in accordance with the flatness of the solid state image input unit 22 and the frame 21.

Though the intermediate holding member 23 is positioned at an upper side of the solid state image input unit 22 in this embodiment, quite the same effect can be attained when the intermediate holding member 23 is positioned at an lower side of the solid state image input unit 22 as shown in FIG. 5(a) without limiting only to the upper side.

In addition, the intermediate holding member 23 may be designed in a triangle shape without limiting to the L shape as denoted in reference numeral 41 in FIG. 5(b). In such case, a rigidity of the intermediate holding member 41 itself can be increased.

Second Embodiment

Figure 5:
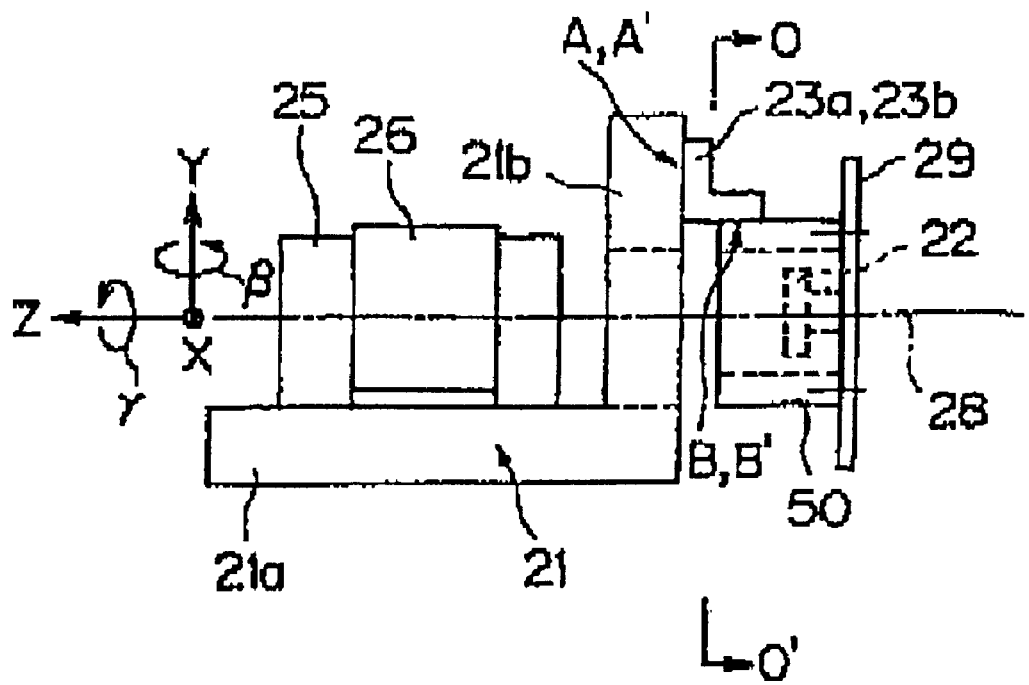
FIG. 5(a) is a elevation view to show the combined relation of a frame, an intermediate holding member and the solid state image input unit utilized in a second embodiment.
FIG. 5(b) is a cross sectional view of FIG. 5(a) cut along the line O—O'.
Figure 5:
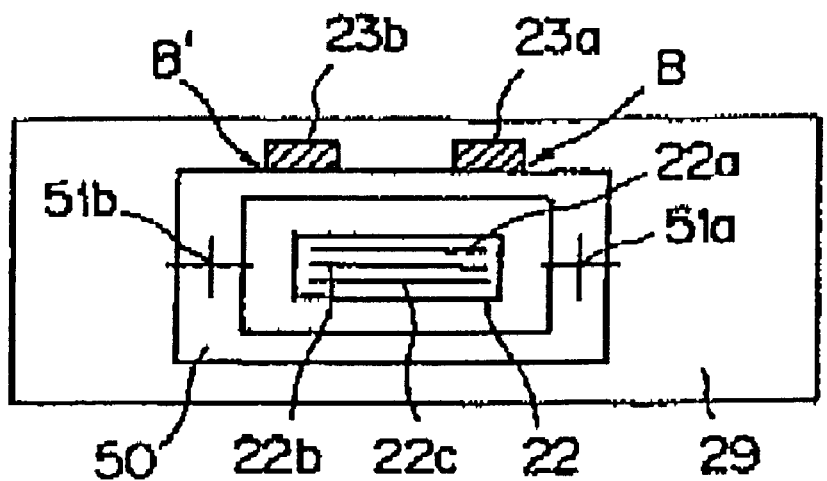

FIG. 5 is a diagram to show a second embodiment according to the present invention, and the mounting structure of these members can be applied to the image read out apparatus such as a copying machine, a facsimile machine, an image scanner and so on, and the image forming apparatus such as printing apparatus and so on as well as the first embodiment.

At this time, though the solid state image input unit is fixed on the intermediate holding member at the second adhered surface B in the first embodiment, the solid state image input unit in this embodiment is arranged to be fixed on the intermediate holding member through a detachable holding member and other configuration is quite the same as that of the first embodiment, on that account the same members are given the same reference numerals and detailed explanation will be omitted.

Moreover in this embodiment, the solid state image input unit constitutes a disposed member according to the present invention, and the solid state image input unit, a substrate and a detachable supporting member constitute a second member according to the present invention.

Further in this embodiment, the intermediate holding member 23 is provided in two pieces as 23a and 23b and at the same time, both the first adhered surface A and the second adhered surface B are provided in two surfaces as the first ads A, A', and B, B'.

Figure 6:
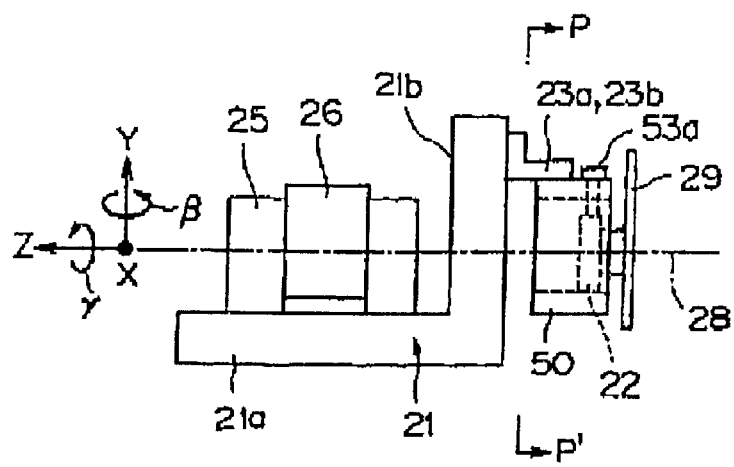
FIG. 6(a) is a elevation view to show the combined relation of the frame, the intermediate holding member and the solid state image input unit which are mounted directly to a detachable holding member utilized in the second embodiment.
FIG. 6(b) is a cross sectional view of FIG. 6(a) out along the line P—P'.
Figure 6:
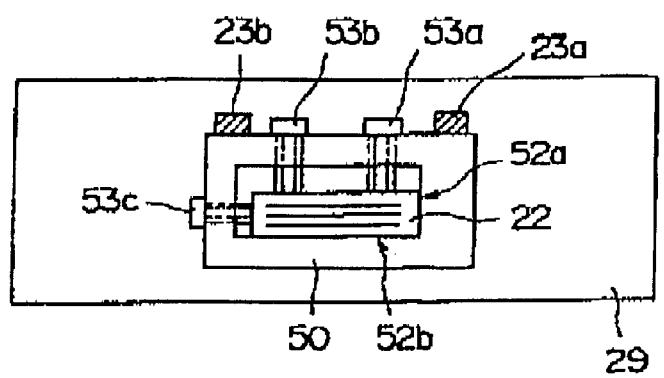

In FIG. 6 the detachable holding member 50 has a rectangular configuration having at the interior thereof a rectangular parallelepiped hole and penetrated opposing surfaces (hereinafter referred to as penetrating surfaces). At one of the surface of penetrating surface a circuit board 29 is inserted and the solid state image input unit 22 is mounted on the circuit board 29, and the circuit board 29 is arranged to be fixed with screws and screw holes 51a, 51b for them made on the detachable holding member 50. The fixing with screws and screw holes may be performed in a usual accuracy of the screw fixation and it is need not to be performed in especially high accuracy.

The detachable holding member 50 is adhered and fixed onto the intermediate holding member 23a, 23b so that the first adhered surface A, A' and the second adhered surface B, B' are parallelized with the pixel line 22a–22c of solid state image input unit 22 which is fixed onto the detachable holding member 50 and at the same time, the first adhered surface A, A' and the second adhered surface B, B'0 are squared together in their directions as well as the fixing method between the solid state image input unit 22 and the intermediate holding member 23 of the first embodiment.

As a result of this, it is designed to direct the line images which is converged by the image forming lens unit 25 from another surface of the penetrating surface of detachable holding member 50 to respective pixel lines 22a, 22b, 22c.

As the positioning adjustment for the solid state image input unit 22, the circuit board 29 is mounted on the detachable holding member 50 and at the same time, solid state image input unit 22 is mounted on the circuit board 29, the positioning adjustment of intermediate holding member 23 on which the solid state image input unit 22 is mounted, is achieved along each direction of X axis, Y axis and β axis and positioning of the intermediate holding member 23 is settled while monitoring the data of optical characteristics transformed through photoelectric conversion by the solid state image input unit 22 as well as the mounting method of the first embodiment.

As described above in this embodiment, in addition to the same effects of the first embodiment can be attained, that are being able to adjust easily only along the five directions, being able to mount the solid state image input unit 22 with higher accuracy, being able to get higher yield of the process, and being able to prevent an occurrence of deterioration in a fixing forth of the solid state image input unit 22 after the solid state image input unit has been completed (after the adhesive material is hardened), the solid state image input unit 22 can be removed from the detachable holding member 50 even when the positional adjustment between the solid state image input unit 22 and the image forming lens unit 25 cannot be successfully achieved because the circuit board 29 onto which solid state image input unit 22 is mounted, is fixed by screws within the detachable holding member 50.

The screw fixation does not need any higher accuracy and the solid state image input unit 22 can be mounted easily onto the detachable holding member 50 because the positioning adjustment of solid state image input unit 22 can be performed after the screws fixation when the circuit board 29 is fixed by screws onto detachable holding member 50.

Though the solid state image input unit 22 is mounted onto the circuit board 29 and the circuit board 29 is fixed onto the detachable holding member 50 utilizing two screws in this embodiment, the solid state image input unit 22 may be fixed directly from outside of a frame of the detachable holding member 50 by means of three screws 52a, 53b, 53c so as to abut on two inner walls 52a, 52b of the detachable holding member 50 as shown in FIG. 6.

Further, screw fixations are utilized when the circuit board 29 is mounted onto the detachable holding member 50 and when the solid state image input unit 22 is directly fixed onto the detachable holding member 50 as described in above in this embodiment, a snap fit may be utilized to fix them.

The fixing portions for screw fixation and snap fit are not limited as described above when the circuit board 29 and solid state image input unit 22 are fixed onto the detachable holding member 50 utilizing screw fixation or snap fit as described above.

Third Embodiment

Figure 7:
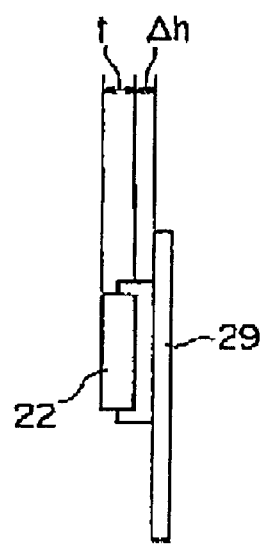
FIG. 7 is a elevation view to show a width of adjustable range when the solid state image input unit of a third embodiment according to the present invention is mounted on the intermediate holding member.
Figure 8:
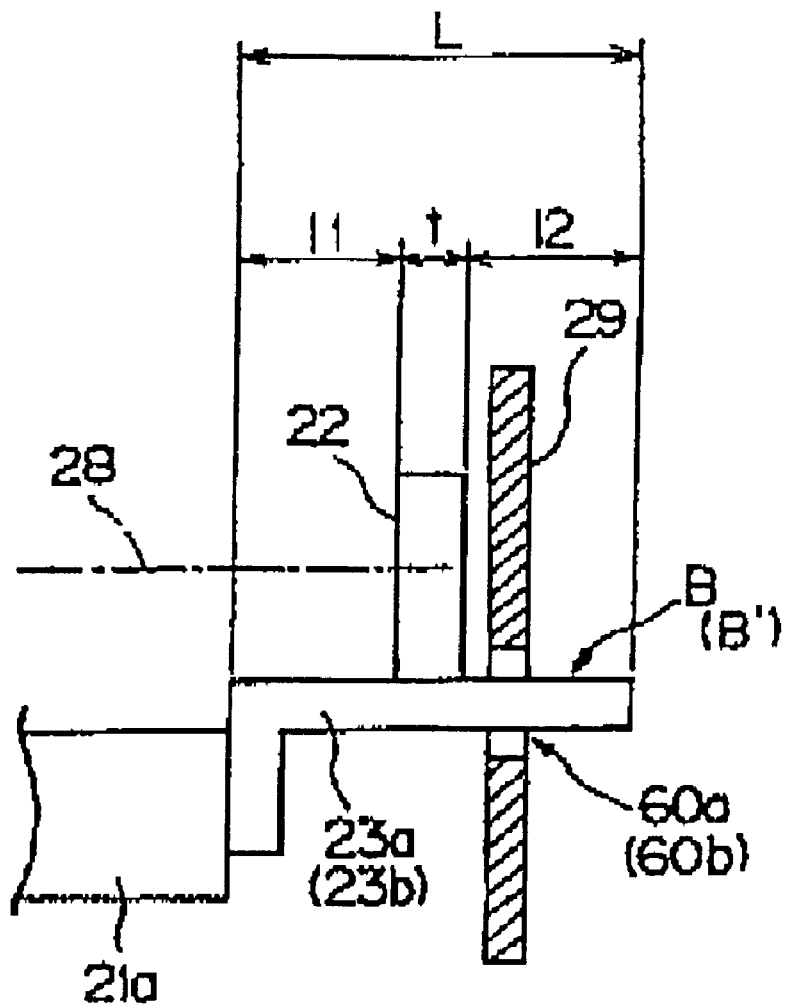
FIG. 8 is an elevation view to show the combined relation of a frame, an intermediate holding member and the solid state image input unit utilized in a third embodiment according to the present invention.
Figure 9:
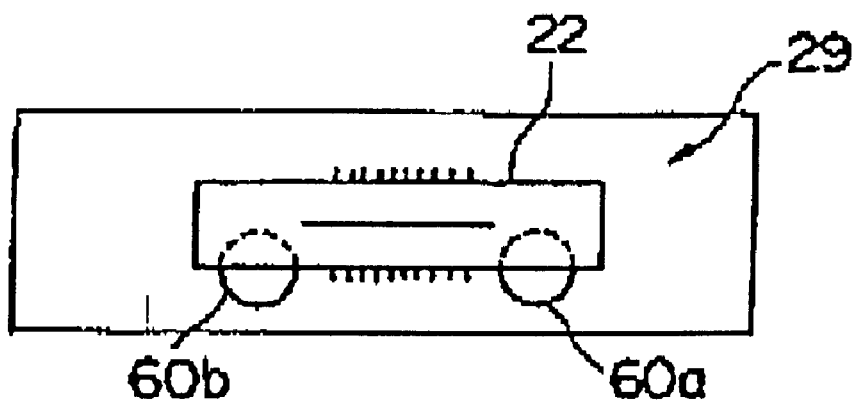
FIG. 9 is a cross sectional view to show the combined relation of the frame, the intermediate holding member and the solid state image input unit utilized in a third embodiment according to the present invention.

FIGS. 7–9 are diagram to show a third embodiment of the mounting structure for members and mounting apparatus for members according to the present invention, and the mounting structure of these members can be applied to the image read out apparatus such as a copying machine, a facsimile machine, an image scanner and so on, and the image forming apparatus such as printing apparatus and so on as well as the first embodiment.

At this point in the first embodiment though the solid state image input unit and the frame are fixed with one intermediate holding member at the first adhered surface A and the second adhered surface B, in this embodiment the solid state image input unit and the frame are fixed with two intermediate holding members as well as the second embodiment, and the intermediate holding members penetrates the circuit board on which the solid state image input unit is mounted.

Ordinarily, an fluctuation for position of an imaging surface to image forming lens unit is about some tens micro meters in an optical system where shrinkage can be happen, on the other hand an fluctuation for position of an object surface to image forming lens unit is about some millimeters (hereinafter refereed to as fluctuation of conjugate length) accordingly when this fluctuation of conjugate length happens, positions of the image forming lens unit and the solid state image input unit must be adjusted in a range of some millimeters along the optical axis.

When the image forming lens unit is slid on the frame, the positioning adjustment is possible if the frame has a surface on which the image forming lens unit slides. However, when the positioning adjustment of solid state image input unit is achieved in a range of some milliliters, the positioning adjustment can be achieved in a range until the intermediate holding member abuts on the circuit board in the side of image forming lens unit, and in a range that adhering area for fixing of the solid state image input unit can be kept in the opposite side of the image forming lens unit.

This range can be sum of a board thickness t and a space between the solid state image input unit 22 and the circuit board 29 Δh, that is t+Δh at the longest as shown in FIG. 7. Ordinarily, t is about 2–3 mm and Δh is about a level of 1 millimeter, and it is designed that they cannot be got longer because of a noise problem.

By this reason, the adjustable range is a level of about ±2 mm as described above, usually a space for adhesion is required a level of about 1–2 mm then the positioning adjustment range becomes substantially a level of ±1 mm.

It is general that the fluctuation of conjugate length is, though different in the image forming lens unit, usually a level of ±2–5 mm, when the fluctuation of conjugate length of over 2 mm is adjusted, a width of adjustable range is too small in a structure such as the first embodiment and the positional adjustment cannot be achieved before fixing because the intermediate holding member 23 abuts on the circuit board 29 or the space area for adhesion cannot be ensured.

This embodiment is characterized by that the positioning adjustment along Z axis is took into consideration, and other configuration is quite the same as the first embodiment and the same reference numerals are given to the same members and detailed explanation will be omitted.

The second adhered surfaces B, B' between the intermediate holding member 23a, 23b and the solid state image input unit 22, have a length L and penetrating the circuit board 29 as shown in FIG. 8 and FIG. 9.

Also, the circuit board 29 has a through hole 60a, 60b which penetrates the intermediate holding member 23a, 23b as a center of height that the solid state image input unit 22 is fixed onto the intermediate holding member 23.

By this configuration, the solid state image input unit 22 which is fixed on the circuit board 29, is made slidable along Z is on the second adhered surface B, B' of intermediate holding member 23a, 23b when the positioning adjustment is performed.

The slidable range of solid state image input unit 22 at this moment is l1+l2+2×t—a space for adhesion as shown in FIG. 8. Accordingly when the slidable range (l1+l2+2×t—the space for adhesion) is set larger than the fluctuation of conjugate length of the image forming lens unit 25, the solid state image input unit 22 can be mounted accurately if the fluctuation of conjugate length happens.

As described above in this embodiment, in addition to the same effects of the first embodiment can be attained, that are being able to adjust easily only along the five directions, being able to mount the solid state image input unit 22 with higher accuracy, being able to get higher yield of the process, and being able to prevent an occurrence of deterioration in a fixing forth of the solid state image input unit 22 after the solid state image input unit 22 has been completed (after the adhesive material is hardened), the positioning adjustment can be accurately achieved even when the fluctuation of conjugate length happens at the image forming lens unit 25 because a width can be set to adjust the width of error along Z axis.

At this point, the through hole 60a, 60b may be in a shape of curved line such as hole or cut portion, in a shape of straight line or a circle as shown in FIG. 9. But what is the most effectively penetrated by the intermediate holding member 23a, 23b, is a shape of projected shape of the intermediate holding member 23a, 23b with a little more wider space that is equal to the error in shape of the circuit board 29 and the intermediate holding member 23a, 23b, and the error of mounting to accept them.

Moreover in this embodiment, when the solid state image input unit 22 is moved to adjust the position of second adhered surface, the through holes 60a, 60b are made and they are penetrated by the intermediate holding member 23a, 28b not to abut on circuit board 29, however, at this moment the solid state image input unit 22 may be positioned on the circuit board 29 in order that the solid state image input unit 22 does not abut on the intermediate holding member 23a, 23b.

For example, when the intermediate holding member 23a, 23b are fixed on the upper side of solid state image input unit 22, the solid state image input unit 22 may be mounted on one upper end of the circuit board 29 so that the circuit board 29 does not abut on the intermediate holding member 23a, 23b. In such configuration, the same effect as this embodiment can be attained.

Fourth Embodiment

FIG. 10s are views to show a fourth embodiment of mounting structure for members and mounting apparatus for members according to the present invention, and this mounting structure for members can be applied to the image read out apparatus such as a copying machine, a facsimile machine, an image scanner and so on, and the image forming apparatus such as printing apparatus and so on.

This embodiment is characterized by that a distance between the image forming lens unit and the solid state image input unit is adjusted with moving the first adhered surface of the intermediate holding member on the frame instead of performing the positioning adjustment of solid sate image input unit along Z axis through a through hole made on the circuit board with penetration of the intermediate holding member and other configuration is quite the same as the first embodiment and the same reference numerals are given to the same members and detailed explanation will be omitted. But as for the intermediate holding member, four members of the intermediate holding member 23a, 23b, 23c, 23d are utilized each two on upper and lower surface of the solid state image input unit.

Figure 10:
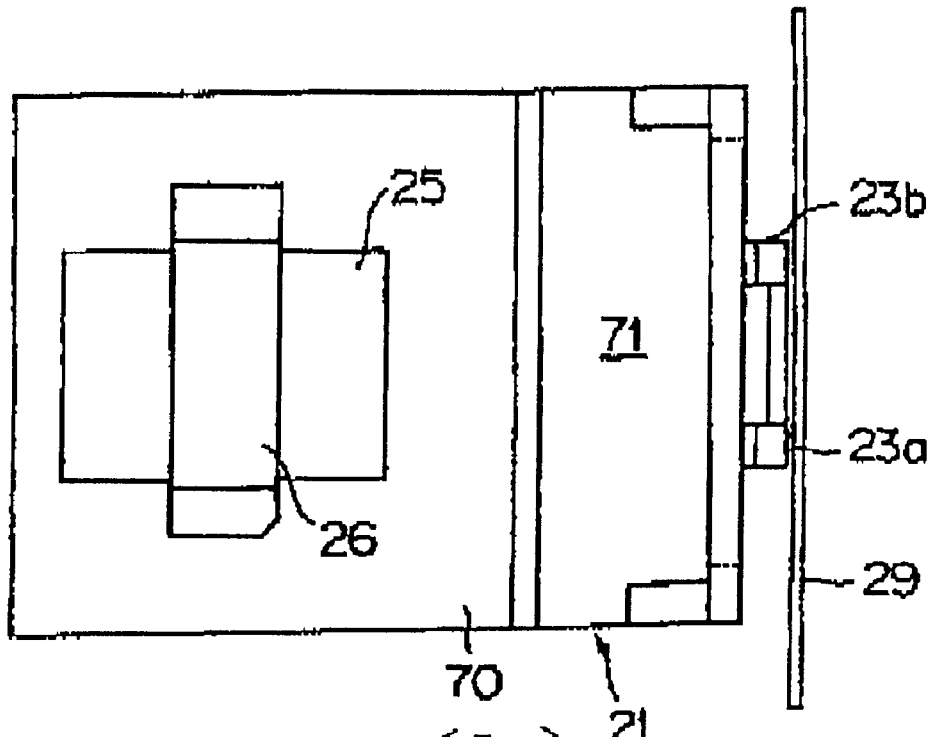
FIG. 10s are views to show another combined relation of a frame, an intermediate holding member and the solid state image input unit utilized in a fourth embodiment according to the present invention.
FIG. 10(a) is a plan view and FIG. 10(b) is a elevation view.
Figure 10:
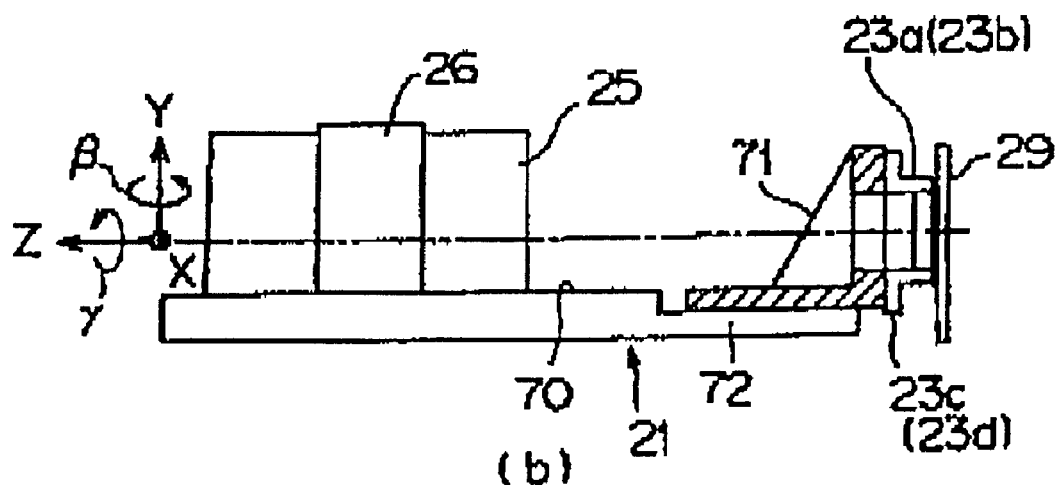

A frame 21 is composed of a image forming lens unit fixing surface 70 onto which the image filming lens unit is fixed, a bracket 71 to perform a conjugate adjustment and a sliding surface 72 on which the conjugate adjusting bracket 71 slides, and the conjugate adjusting bracket 71 constitutes a adjusting member according to the present invention as shown in FIG. 10.

The image forming lens unit fixing surface 70 corresponds to the horizontal portion 21a of the first embodiment, and the sliding surface 72 is designed to locate lower than the image forming lens unit fixing surface 70. When the positioning adjustment between the solid state image input unit 22 and the image forming lens unit 25 is performed, the conjugate adjusting bracket 71 is made to slide on the sliding surface 72, then the conjugate adjusting bracket 71 is fixed after positions for the solid state image input unit and the image forming lens unit 25 are decided.

As a result of this, if a movable range of the conjugate adjusting bracket 71 is set larger than the fluctuation of conjugate length for the image forming lens unit 25, the solid state image input unit 22 can be accurately fixed even when a fluctuation of the conjugate length happens.

As described above in this embodiment in addition to the effect of the first embodiment as well as the third embodiment, even when a fluctuation of the conjugate length happens, the positioning adjustment can be accurately achieved because it can be set enough space to correct the width of error along the Z axis.

Fifth Embodiment

Figure 11:
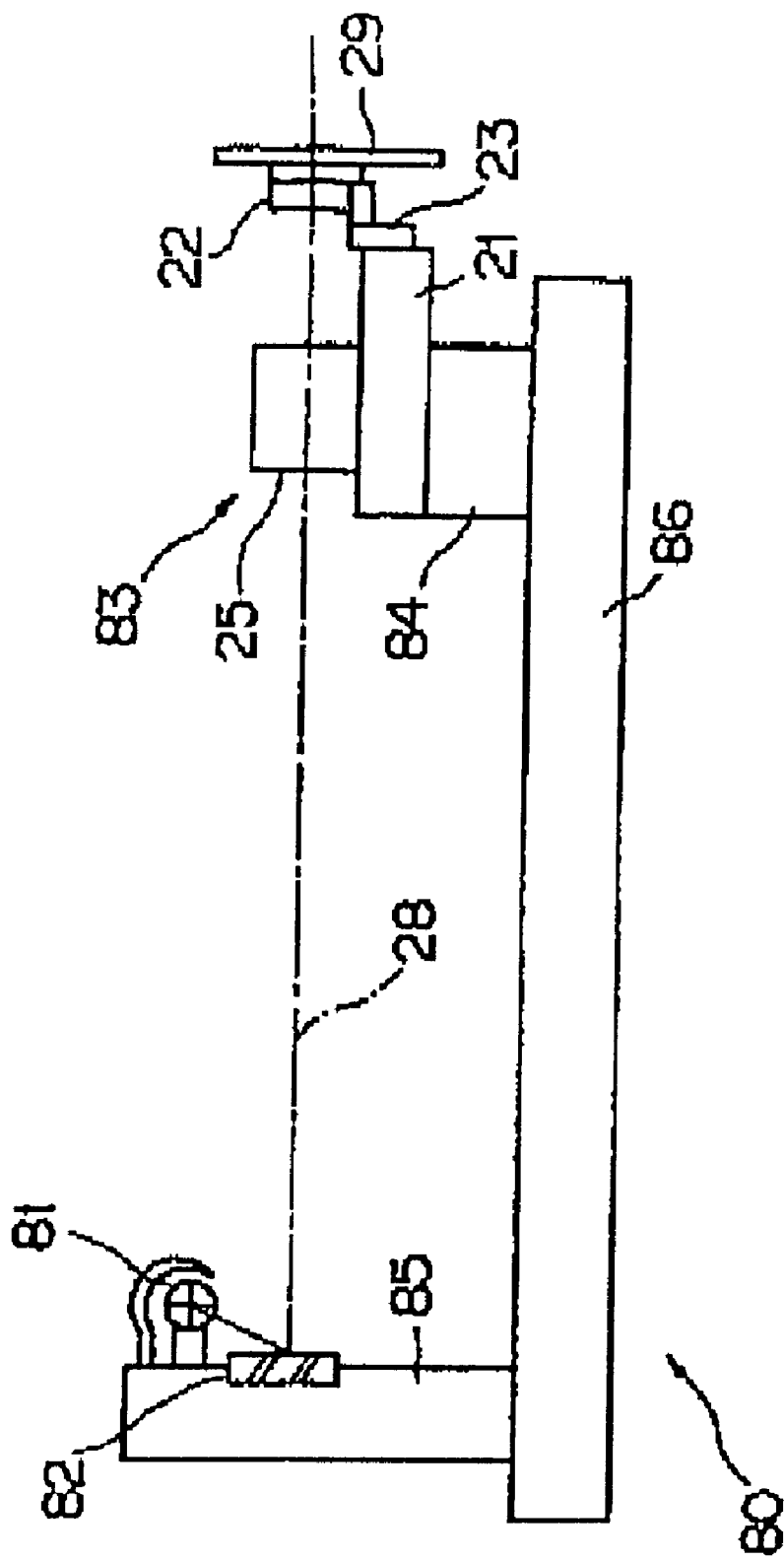
FIG. 11 is an elevation view of the mounting apparatus for solid state image input unit of the fifth embodiment according to the present invention.
Figure 12:
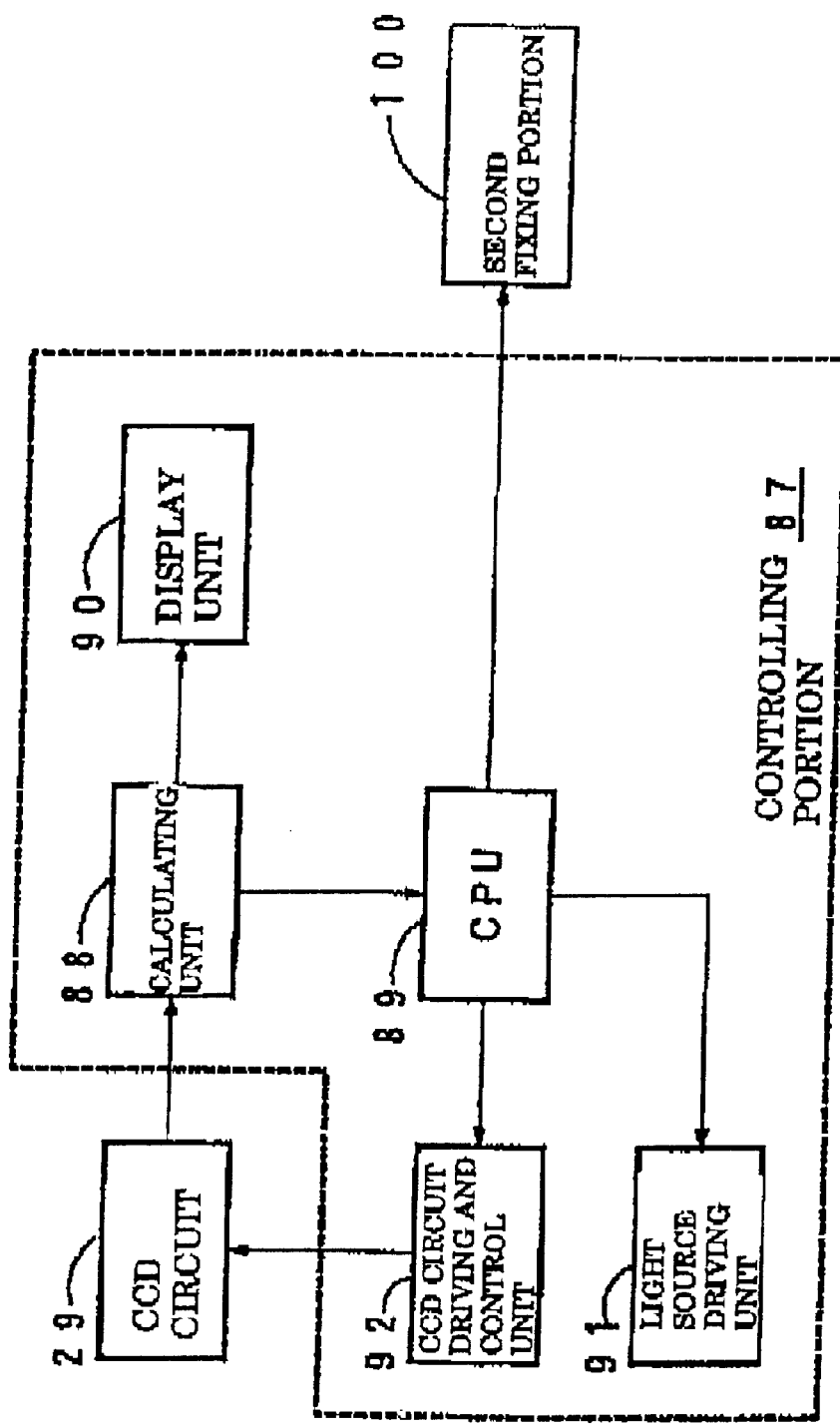
FIG. 12 is a block diagram of a control unit for the mounting apparatus of fifth embodiment according to the present invention.
Figure 13:
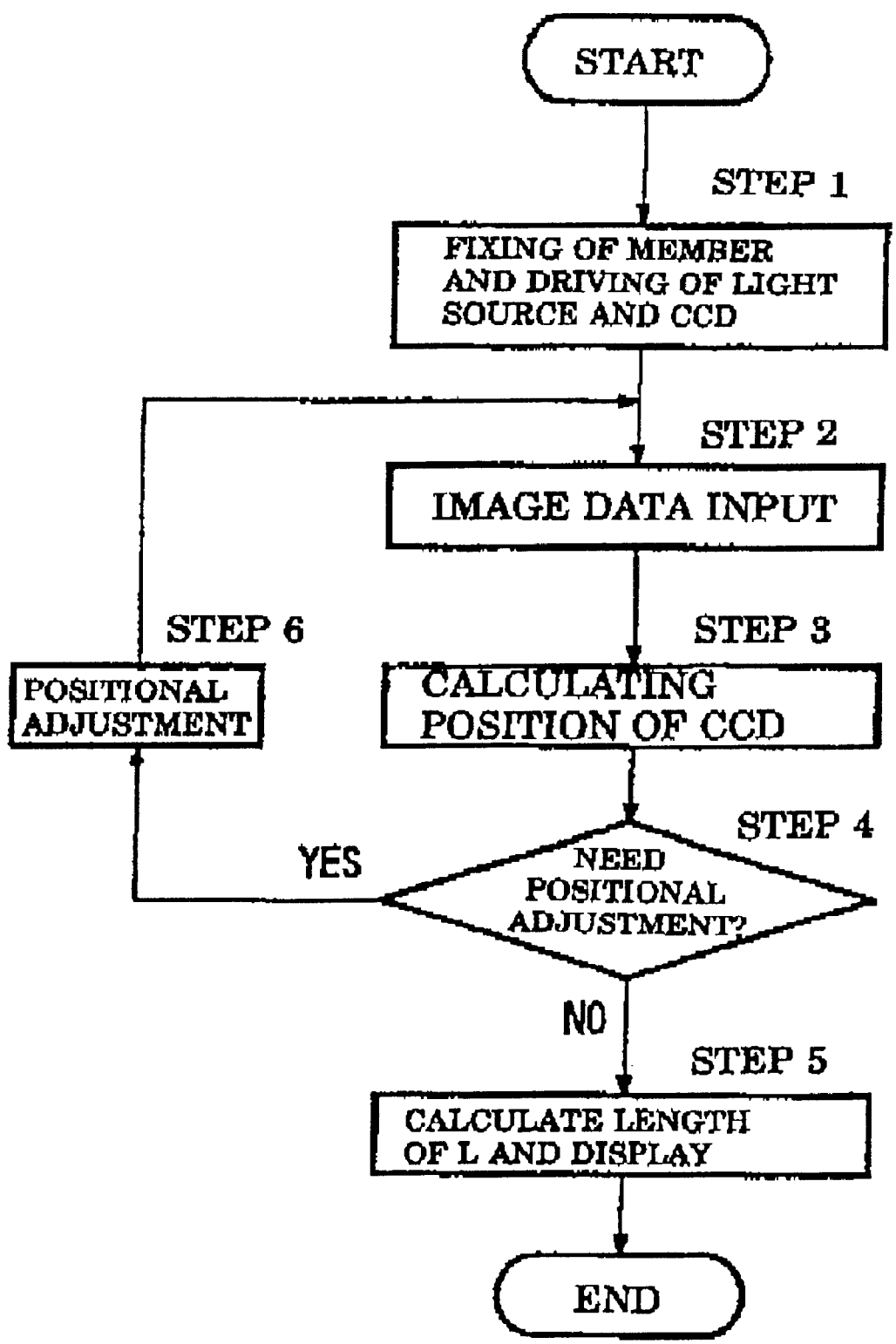
FIG. 13 is a flow chart to show an operation of the mounting apparatus of fifth embodiment according to the present invention.

FIGS. 11–13 are a view, a diagram and a flow chart to show a fifth embodiment of mounting structure for members and mounting apparatus for members according to the present invention, and the mounting apparatus is applied to a mounting apparatus for the solid state image input unit.

At this time, this embodiment is an embodiment of the apparatus that positioning adjustment for the solid state image input unit is achieved along a direction of the Z axis in the third embodiment, because the members that have mounting structure for members are quite the same as the third embodiment, the same member is given the same reference numeral and the detailed explanation will be omitted.

Firstly, the configuration will be explained.

The solid state image input unit mounting apparatus 80 shown in FIG. 11 is composed with a light source 81, a chart 82 which is illuminated by the light source 81, a fixing table 84 to hold solid state image input unit member 83 consisted of the frame 21, the solid state image input unit 22 and the intermediate holding member 23 of third embodiment, a chart holding member 85 to hold the light source 81 and the chart 82, a base 86 to fix the chart holding member 85 and the fixing table 84, and a controlling portion 87 to control (see FIG. 12).

The light source 81 is located above the chart holding member 85 to illuminate the chart, and the chart 82 is located in order that a center of the chart 82 coincides with an optical axis of the solid state image input unit 22 and the image forming lens unit 25.

The fixing table 84 has a first fixing portion to fix the frame 21 with a chuck and so on, and a second fixing portion 100 to fix the solid state image input unit 22 with a chuck and so on. The second fixing portion is made to move parallely along a direction of the Z axis that is back and forth of the chart direction by the controlling portion 87.

And, the fixing table 84 is capable of changing its height upward and downward, since it is made to be able to adjust in order the center of chart coincides with the optical axis of image forming lens unit 25 fixed on the fixing table 84.

A distance between the fixing table 84 and the chart holding member 85 is made to be changeable according to a focal length of the image forming lens unit 25 and the fixing table 84 moves parallely and reciprocally along a direction of the chart holding member.

The controlling portion 87 shown in FIG. 12 has a calculation unit 88 which is input an image data output from a circuit board (hereinafter referred to as CCD circuit board) where the solid state image input unit 22 is mounted, and calculates a position of the solid state image input unit 22, a central processing unit (hereinafter referred to as CPU) 89 to control the second fixing portion 100, a display unit 90 to display a length L of the second adhered surface of intermediate holding member 23a, 23b of the third embodiment shown in FIG. 8, and a CCD circuit driving and control unit 92 to drive the solid state image input unit 22 and the CCD circuit board 29. At this point in FIG. 12, the CCD circuit board is denoted as a CCD circuit.

To the calculation unit 88, the image data from the solid state image input unit 22 an which an image of chart 82 is focused through the image forming lens unit 25, is input and the position of solid state image input unit 22 is calculated based on the image data.

The CPU 89 makes the second fixing portion 100 move along a direction of the Z axis, that is along the optical axis on the basis of calculated result calculated in the calculating unit 88. And, the CPU 88 is made to control the light source driving unit 91 and the CCD circuit driving and control unit 92.

The display unit 90 calculates and displays the L shown in FIG. 8 after the second fixing portion is adjusted.

An operation of this mounting apparatus 80 will be explained with reference to FIG. 13.

Firstly, the solid state image input unit member 83 is fixed on the first fixing portion and the second fixing portion 100 of fixing table 84 and a height of the fixing table 84 is coincided with a center of the chart 82 and the optical axis 28, and at the same time, a distance from the chart 82 is adjusted based on the focal length of image forming lens unit, an electric power supply is turned on and the solid state image input unit 22 is activated (Step 1).

Then, the image of chart 82 is focused on the solid state image input unit 22, the image data are output and the image data are input to the calculating unit 88 (Step 2).

The calculating unit 88 calculates the position of solid state image input unit 22 on the basis of these image data (Step 3).

Next, the CPU 89 judges if there is a fluctuation of the conjugate length based on the result of calculation (Step 4). In case when there is no fluctuation of the conjugate length, the CPU calculates a length of the second adhered surface B of intermediate holding member 23, and displays the length L (Step 5), and terminates the operation. When in a case there is a fluctuation in the conjugate length, it makes the second fixing portion 100 move parallely and performs the positioning adjustment (Step 6) and the solid state image input unit 22 is focused the image of chart 82 again.

As described above in this embodiment because the image of chart 82 illuminated by the light source 81 is focused on the solid state image input unit 22 through the image forming lens unit 25, and the position of second fixing portion 100 can be calculated, even when the fluctuation of a relative positional discrepancy happens between the frame 21 and the solid state image input unit 22 caused by a fluctuation of the conjugate length occurred in the forming lens unit 25, the position along a direction of the Z axis can be adjusted by the second fixing portion 100, and the solid stat image input unit 22 can be fixed onto the intermediate holding member 23 with a fixing accuracy of the solid state image input unit 22 kept in a higher level.

At this time in this embodiment, the solid state image input unit 22 is get the positioning adjustment and fixed after it is held onto the second adhered surface by a chuck and so on, it may be utilized that several kinds of intermediate holding member 23 are prepared and every time the positioning adjustment is performed a intermediate holding member 23 which corresponds to the length L is selected and fixed.

Also, a solid state image input unit member with a structure of the fourth embodiment may be utilized for the solid state image input unit member utilized in this embodiment. In this case, the second fixing portion 100 is made to hold the conjugate adjusting bracket.

Sixth Embodiment

Figure 14:
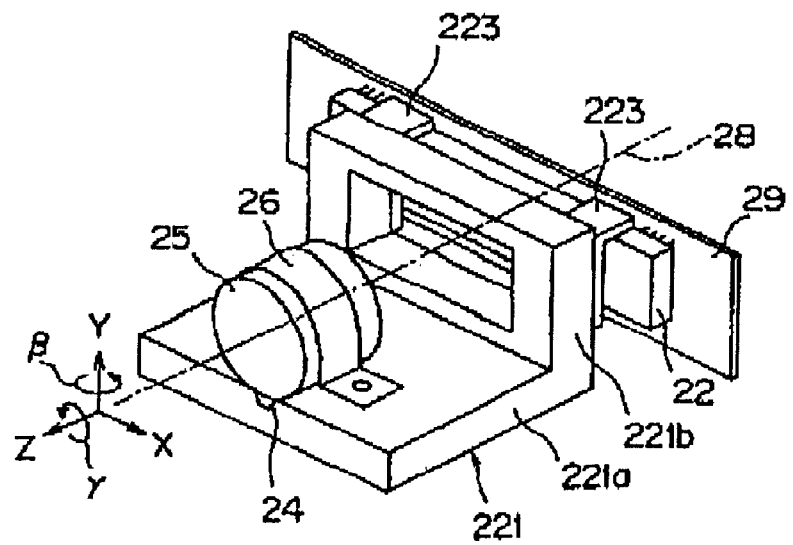
FIG. 14 is a perspective view to show a mounting structure of members for solid state image input unit according to the present invention.
Figure 15:
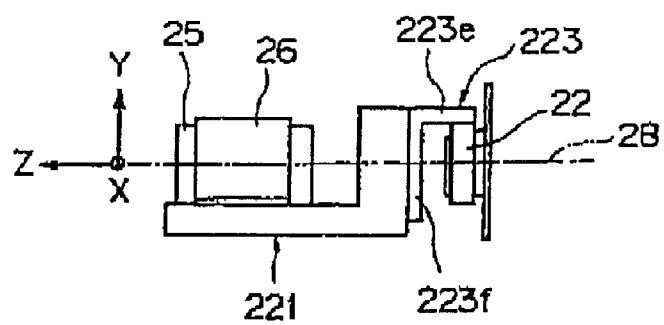
FIG. 15 is an elevation view to show a mounting structure of members for solid state image input unit according to the present invention.
Figure 16:
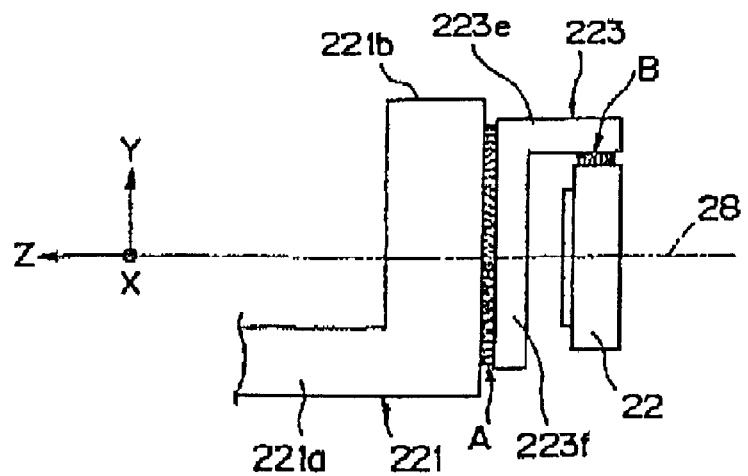
FIG. 16 is an enlarged view of the relevant part in FIG. 15.

FIGS. 14–16 are views to show a sixth embodiment of the mounting structure for members and mounting apparatus for members according to the present invention, and the mounting apparatus is applied to a mounting apparatus for the solid state image input unit.

The sixth embodiment is intended further to provide a mounting structure for solid state image input unit in which a restriction on layout does not occur because all parts for it can be contained within a space of the minimum requirement.

Figure 48:
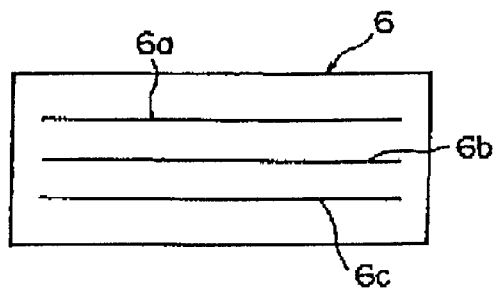
FIG. 48 is a rough sketch of front view of the solid state image input unit in the prior art technology.
Figure 49:
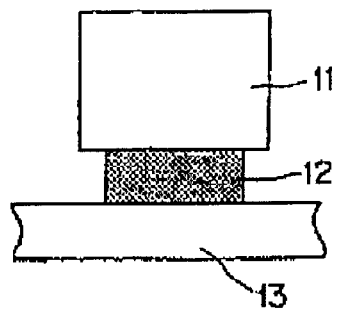
FIGS. 49(a) and 49(b) are elevation views to show a mounting process of a work piece in the prior art technology.
Figure 49:
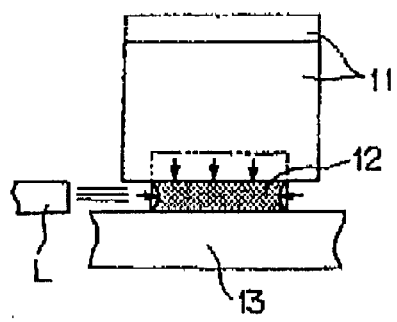
Figure 50:
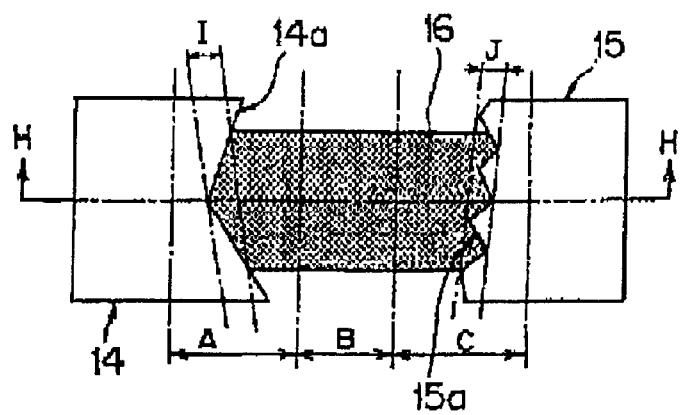
FIG. 50s are views to show a model of caulking adhesion method.
FIG. 50(a) is a plan view and FIG. 50(b) is a cross sectional view cut along the line H—H line.
Figure 50:
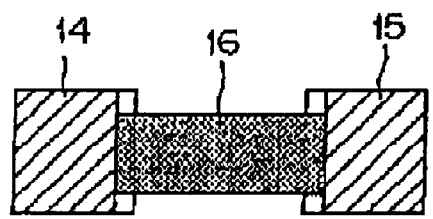

In FIGS. 14 and 15 a image forming lens unit 25 to form an image of document on the respective pixel lines 6a, 6b, 6c (see FIG. 48) of R, G and B is pushed by a lens holding plate 26 and held on a frame 221 as the first member. At this time, the optical axis 28 of this image forming lens unit 25 corresponds to a direction of the Z axis in the coordinate system. In addition, the direction of X axis corresponds to a direction of the main scanning line of image input unit, that is a line direction along the pixel lines and a direction of the Y axis corresponds to a direction along the secondary scanning line.

Further, the CCD circuit bard 29 is implemented the solid state image input unit 22. At this point, CCD circuit board 29 has function to drive the solid state image input unit 22, and to output the electric signal corresponding to the focused optical image on the solid state image input unit 22 to the image input unit after the required electric processes have been performed.

And, the solid state image input unit 22 is mounted onto a vertical portion 221b of the flame 221 through a intermediate holding member 223 which has a shape of letter L.

The intermediate holding member 223 and the solid state image input unit 22 are adhered together and fixed at the second adhered surface B disposed on a side surface of the solid state image input unit 22 in FIG. 16. And, the intermediate holding member 223 and the frame 221 are adhered together and fixed at the first adhered surface A of vertical portion 221b.

At this time, the first adhered surface A as the adhered surface of frame side, is located at a position intersecting with the optical axis 28 looking from the direction of X axis as shown in FIG. 16. Because of this the height of a horizontal portion 223e of the intermediate holding member 223 and the vertical portion 221b of frame 221 are almost equal to the height of lens holding plate 26 as shown in FIG. 15.

With regard to the height direction (Y direction), at least an amount of the height of image forming lens unit 25 must be secured even in the minimum case. As a result, a layout of the whole structure can be maintained keeping things as they are while the area (that means an adhesive forth) for adhesion is increased by means that a vertical portion 223f of the intermediate holding member 223 is expanded to a size equal to that of the lens like FIG. 15. In other words, a restriction in layout does not occur because all parts can be contained in a minimum requirement space.

As for an adhering means for the solid state image input unit 22 and the intermediate holding member 223, and an adhering means for the image forming lens unit 25 and the intermediate holding member 223, to utilize specially an ultraviolet curing adhesive material which has a hardening time of level of ten seconds, has a merit from a view point of productivity. In this case, the transparent members such as glass, plastic and so on are employed as the intermediate holding member 223, and the ultraviolet (not shown) is made to pass through the intermediate holding member 223 and to irradiate the first adhered surface A and the second adhered surface B, and then the hardening is made possible.

During a hardening of the adhesive material in the manufacturing process the frame 221 and the solid state image input unit 22 are in a state that they are held by a manufacturing apparatus (not shown) on the other hand the intermediate holding member 223 is in a state that it is not held by anything.

By this arrangement, the ultraviolet begins to shrink from an initial state. By this shrinkage of the adhesive material, the adhesive material is hardened while the intermediate holding member 223 moves such as it is pulled by the frame 221 and the solid state image input unit 22.

The adhering thickness of the first adhered surface A and the second adhered surface B in this adhering fixation is the thinner the better to reduce an effect of shrinkage. However, there comes a necessity having to set a thickness to cover a difference between concavity and convexity of the surface in accordance with the flatness of the solid state image input unit 22, the frame 221 and the intermediate holding member 223 in actual.

By the way, in a manufacturing process the solid state image input unit 22 must be adjusted in a predetermined position before the adhering fixation. In other words, it is required that to read out the optical characteristics (focus, magnification) within a predetermined required accuracy at the adjusted position and to adjust the position of the solid state image input unit 22 with a micro moving along the five axes of X, Y, Z, β and γ.

To attain the above firstly as for the X direction, the solid state image input unit 22 is slid along a direction of the X axis on the second adhered surface B to be adjusted.

As for the Y direction, it is adjusted by means that the intermediate holding member 223 and the solid state image input unit 22 are slid working together on the first adhered surface A.

As for the Z direction, it is abusted by means that the solid state image input unit 22 is slid along a direction of Z axis on the second adhered surface B.

As for β direction in the rotational adjustment, the solid state image input unit 22 makes a rotational moving working together in β direction on the second adhered surface B to be adjusted.

As for γ direction in the rotational adjustment, the intermediate holding member 223 and the solid state image input unit 22 make a rotation working together in γ direction on the first adhered surface A to be adjusted.

The each movement along the X, Y, Z, β and γ axes can be performed fully independently from each other. It is caused by that the first adhered surface A and the second adhered surface B are arranged in right angle each other. The sliding movement for adjustment can be coincided with the rectangular coordinate because the first adhered source A and the second adhered surface B are made in a right angle together.

As described above according to the sixth embodiment because the first adhered surface A is located to make a right angle with the optical axis 28 and at the same time, the height of optical axis is set within the range of a height of the first adhered surface A along the vertical direction, and a shrinkage at the intermediate holding member 223 is transformed to a movement to come nearer (a slide) to the solid state image input unit 22 and the frame 221 with regard to an effect of hardening shrinkage which occurs at a hardening of the adhesive material, the positional discrepancy at the solid state image input unit itself can be suppressed and the solid state image input unit 22 can be located with high accuracy in relation to the frame 221.

Moreover, the whole structure can get a micro movement to adjust its position along the respective five directions of X, Y, Z, β and γ axes by means that sliding adjustments are performed in the two surfaces being right angle each other (the first adhered surface A and the second adhered surface B).

Further again, the whole parts of structure can be contained in the minimum required space and occurrence of a restriction for the layout can be prevented because the first adhered surface A and the second adhered surface B can be included within the vertical (Y direction) range of the image forming lens unit 25 which is the fundamental restricted area on the layout by means that the first adhered surface A and the optical axis are located in the same height when viewing along the X direction.

Seventh Embodiment

Figure 17A:
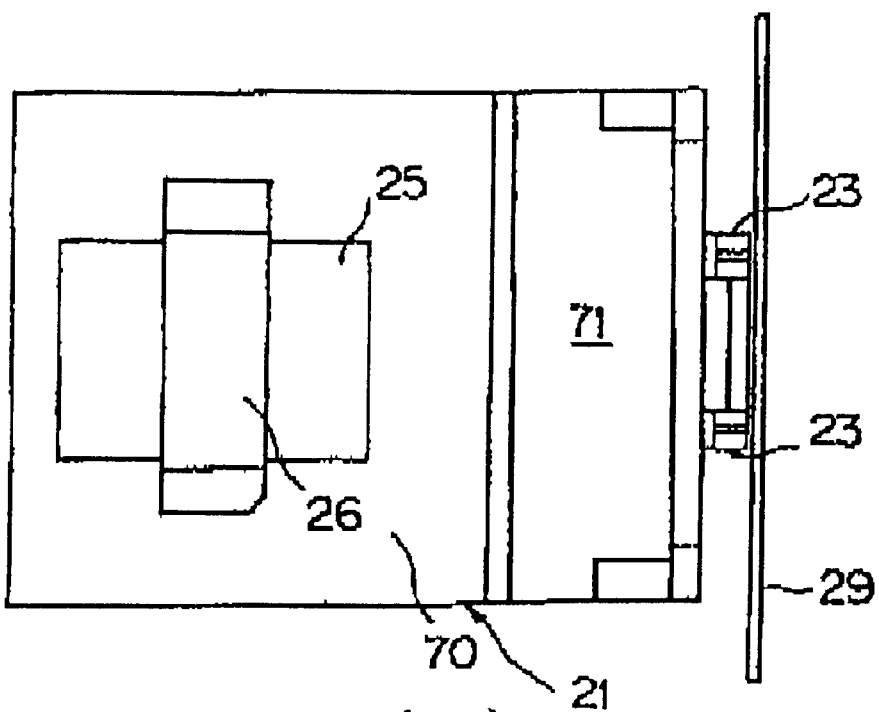
FIG. 17(a) is a plan view.
Figure 17B:
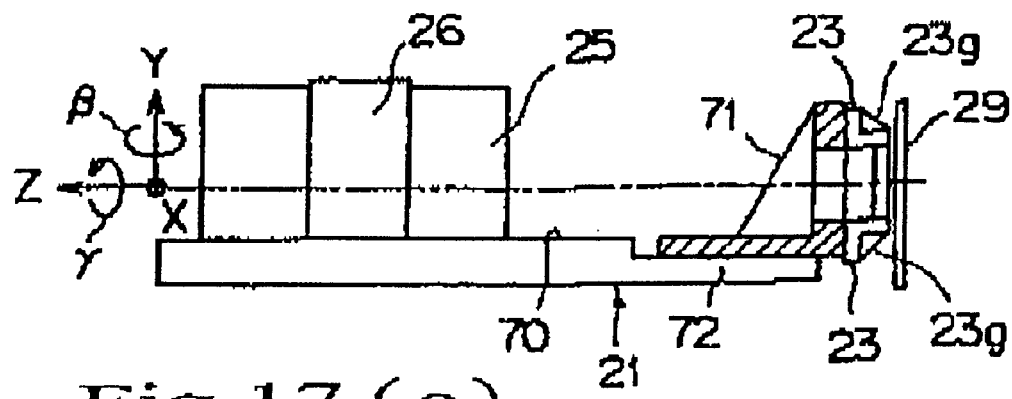
FIG. 17(b) is a elevation view and FIG. 17(c) is a front view to show a state that the intermediate holding member is adhered onto a frame.
Figure 17C:
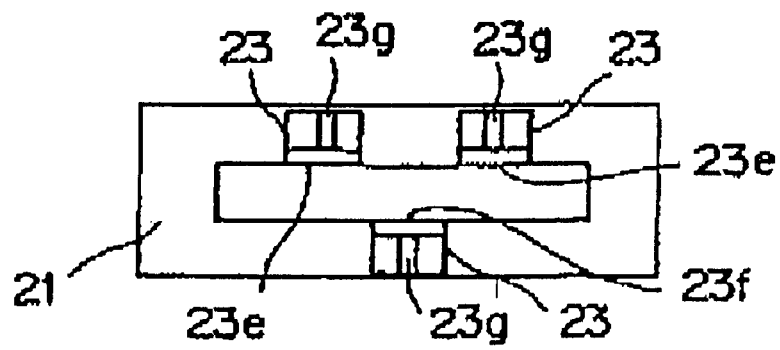
Figure 18:
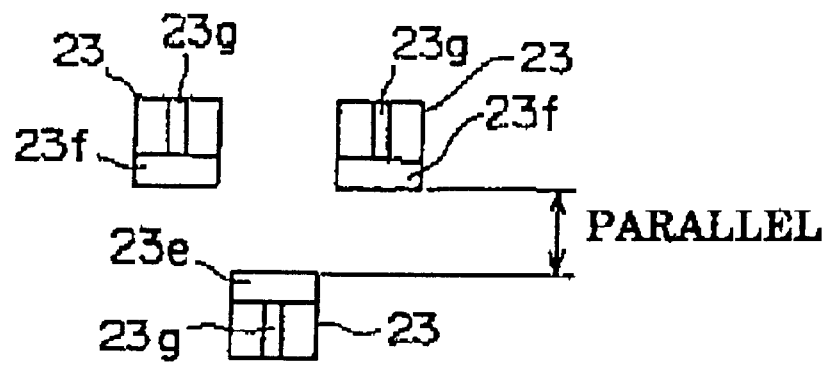
FIG. 18s are elevation views of layout of the intermediate holding member.
FIG. 18(a) shows a layout in which they are arranged parallely.
FIG. 18(b) shows a layout in which they are arranged in opposing position.
Figure 18:
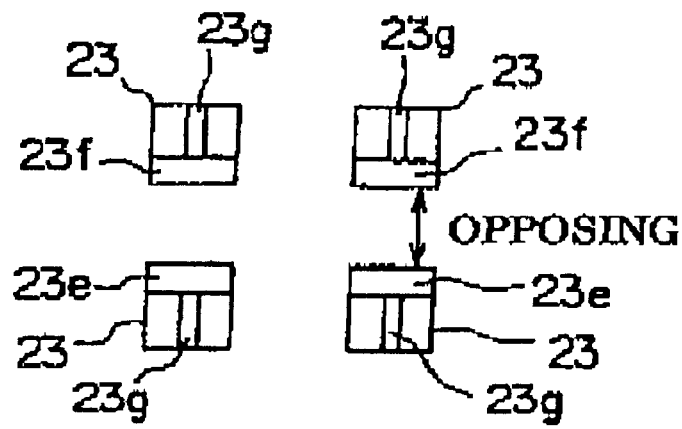

FIGS. 17–18 are views to show a seventh embodiment of the mounting structure for members and mounting apparatus for members according to the present invention, and the mounting apparatus is applied to a mounting apparatus for the solid state image input unit.

In this seventh embodiment, a number of the intermediate holding member 23 to fix the solid state image input unit 22 is made to be more than at least two and the adhered surface 23e located in the side of solid state image input unit 22 of at least one of the intermediate holding member 23, is arranged to oppose to the adhered surface 23f of other intermediate holding member 23 located in the side of solid state image input unit 22 as shown in FIG. 17. At this point, a reference numeral 23g denotes a rib.

At this time, it is possible that the adhered surface 23e and the adhered surface 23f are located to be parallel each other as shown in FIG. 18(a), and the adhered surface 23e and the adhered surface 23f are located to oppose each other as shown in FIG. 18(b).

Figure 1:
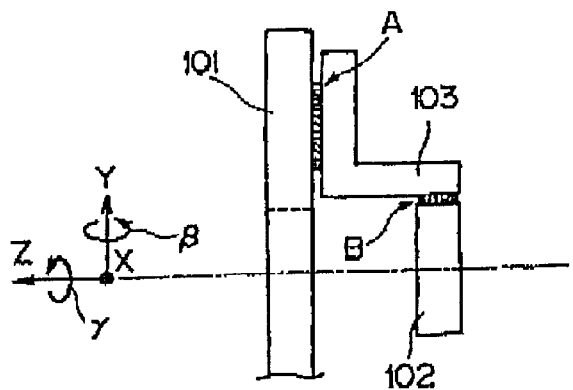
FIG. 1 is an elevation view to show the present invention.

A characteristic frequency of mechanical vibration and a shape of mechanical vibration of a mounting structure of the solid state image input unit 22 in which the intermediate holding member 23 are located as this seventh embodiment and a mounting structure of the solid state image input unit 22 of the first embodiment as shown in FIGS. 1–3 are calculated with the numerical analysis till mode three and compared together. In accordance with this comparison the characteristic frequency of mechanical vibration for the structure of the seventh embodiment is higher about a level of 30–50% than that of the first embodiment, it shows that the structure of seventh embodiment is much stronger for vibration.

As described above according to the seventh embodiment, a structure of this kind can become much stronger for the external force and the vibration than a structure in which the same number of intermediate holding member are located in the same side because a number of the intermediate holding member 23 to fix the solid state image input unit 22 is made to be more than at least two and the adhered surface 23e located in the side of solid state image input unit 22 of at least one of the intermediate holding member 23, is arranged to oppose to the adhered surface 23f of other intermediate holding member 23 located in the side of solid state image input unit 22.

At this point, it may be possible that as for a shape of the intermediate holding member, a shape of triangle pole having right angle or the intermediate holding member in which rib are arranged on it as shown for one example in the seventh embodiment, is utilized.

Eighth Embodiment

Figure 19:
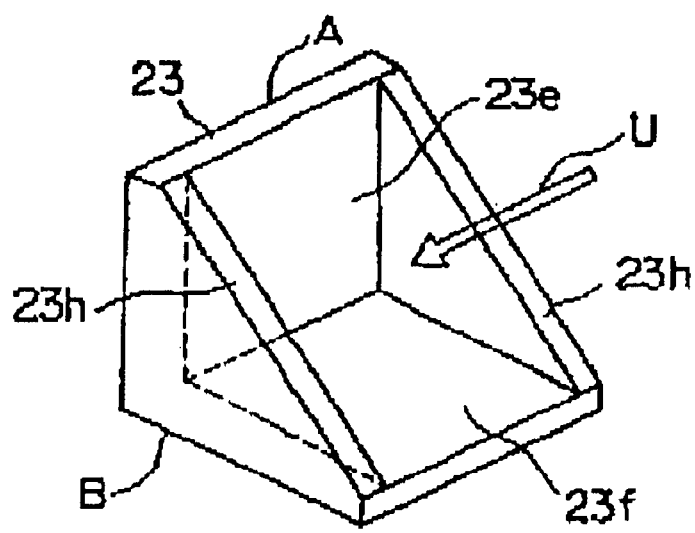
FIG. 19 is a perspective view to show the intermediate holding member for mounting structure for members and mounting apparatus for members of eighth embodiment according to the present invention.

FIG. 19 is a view to show the intermediate holding member utilized in a eighth embodiment of the mounting structure for members and mounting apparatus for members according to the present invention, the whole structure other than the intermediate holding member is quite the same with the seventh embodiment shown in FIG. 17 and the mounting apparatus is applied to a mounting apparatus for the solid state image input unit.

In this eighth embodiment ribs 23h are arranged in the both ends of both adhered surfaces of the intermediate holding member 23 in order that the ribs make a right angle with both of the adhered surface in solid state image input unit side and the adhered surface in intermediate holding member side as shown in FIG. 19. And they are located to fix the frame 21 and the solid state image input unit as shown in FIG. 17, then ultraviolet is irradiated to harden the ultraviolet curing adhesive material from a direction shown by an arrow U in FIG. 19. At this time, an amount of the ultraviolet per unit area passing through the flat portion 23e, 23f of the Intermediate holding member 23 is the same amount as for an L shaped intermediate holding member without rib 23h (for example see FIG. 2 or FIG. 3). Because of this especial unevenness in hardening of the ultraviolet curing adhesive material does not occur and furthermore the intermediate holding member is get stronger in comparison with the intermediate holding member which has not the ribs 23h for the external force and the mechanical vibration from a view point of strength.

As described above according to the eighth embodiment, a mounting structure which is strong against the external force and the mechanical vibration can be realized because the same level of strength as a intermediate holding member having a shape of triangle pole can be given, and the adhered surface can be made flat, further the amount of ultraviolet passing through the intermediate holding member can be distributed uniformly and homogeneous adhering quality can be realized by means that ribs 23h having a shape of vertical rib are arranged in both end of the adhered surfaces (the first adhered surface A and the second adhered surface B) of the intermediate holding member.

Ninth Embodiment

FIGS. 20–25 are views to show a ninth embodiment of the mounting structure for members and mounting apparatus for members according to the present invention, and the mounting apparatus is applied to a mounting apparatus for the solid state image input unit.

Figure 20:
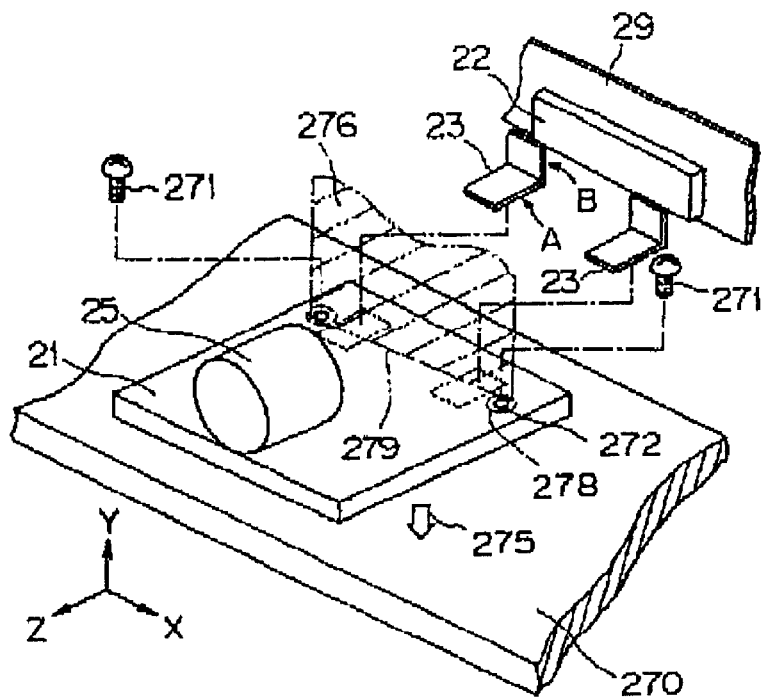
FIG. 20 is an exploded perspective view to show the intermediate holding member for mounting structure for members and mounting apparatus for members of ninth embodiment according to the present invention.
Figure 21:
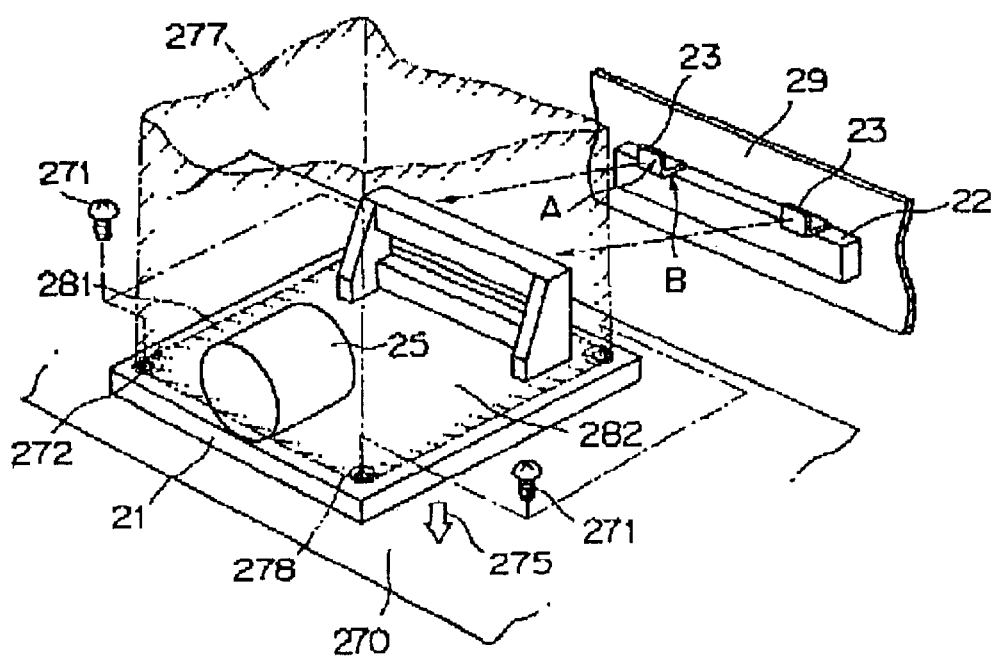
FIG. 21 is an exploded perspective view to show another intermediate holding member for mounting structure for members and mounting apparatus for members of ninth embodiment according to the present invention.

FIG. 20 shows one example of the ninth embodiment and FIG. 21 shows another example of the ninth embodiment.

As shown in FIG. 20 and FIG. 21, the frame 21 is mounted on a housing 270 by means of fixing means 271 such as screws after all the adjustment has been completed and the adhesive material has been hardened. The fixing means 271 usually has more than two of fixing portions 272 to fix stably the frame 21. At this time, the frame 21 is clamped at a plane 278 in which the frame 21 and the fixing means 271 contact by the fixing means 271.

Figure 24:
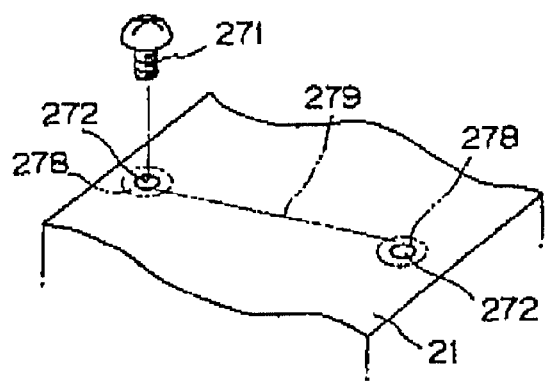
FIG. 24 is an enlarged view of the relevant part in FIG. 20.

A line 279 can be formed between arbitrary two points within the respective two planes 278 which clamp the arbitrary two fixing portions 272 on the frame 21 as shown in FIG. 24 which is an enlarged view of the relevant part in FIG. 20.

The first adhered surface A which adheres the intermediate holding member 23 and the frame 21 is located on a plane 276 which is given when the line 279 is extended parallely in a direction 275 along the housing is fixed (direction 275).

Figure 25:
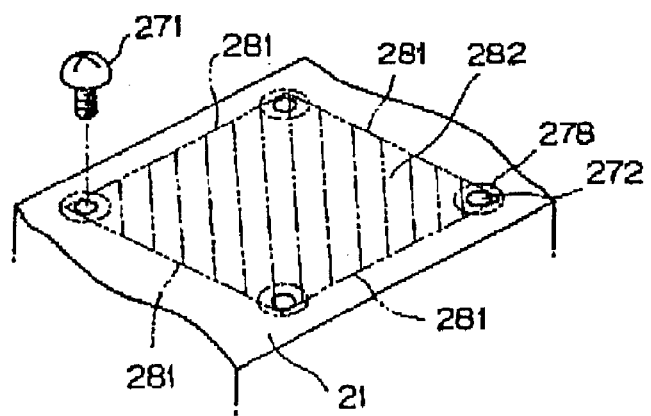
FIG. 25 is an enlarged view of the relevant part in FIG. 21.

A plane 282 can be formed when the lines 281 tie between arbitrary two points on the plane 278 which clamps more than three fixing portion 272 as shown in FIG. 25 which is an enlarged view of the relevant part in FIG. 21.

The first adhered surface A which adheres the intermediate holding member 23 and the frame 21 is located in a space 277 which is given when the plane 282 is extended parallely in a direction 275 along the housing as shown in FIG. 21.

Figure 22:
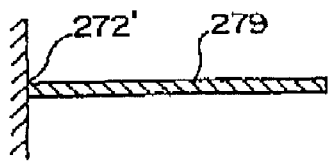
FIG. 22 is a front view to show a model of beam shape when a first adhered surface onto which adheres the intermediate holding member and the holding member locates outside of the space.

At this time when in a case the first adhered surface A which adheres the intermediate holding member 23 and the frame 21 is located outside with regard to the space 277, this structure can be supposed as a simple model with a shape of beam (hereinafter referred to as beam model) in that the fixing portion 272 is looked on as a fixing portion of the beam model 272', and the system composed with the frame 21—the intermediate holding member 23—the solid state image input unit 22 is looked on as a beam 279, then the system can be represented as a cantilever model as shown in FIG. 22.

Figure 23:
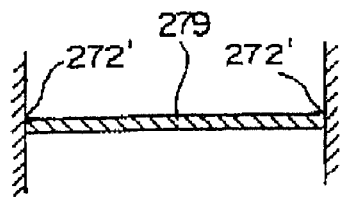
FIG. 23 is a front view to show a model of beam shape when the structure of FIG. 20 which one example of mounting structure for solid state image input unit in the ninth embodiment or the structure of FIG. 21 which is another example of mounting structure for solid state image input unit in the ninth embodiment is assimilated in the same manner.

When the structure of one example of the ninth embodiment of mounting structure for solid state image input unit shown in FIG. 20 and the structure of another example shown in FIG. 21 are similarly looked on as the beam shape model, they are represented as a beam model with both ends are fixed as shown in FIG. 23.

At this point when a strength and an own weight of the beam portions of the above both models are the same, the both end fixed model is stronger and has a higher characteristic frequency than the cantilever model.

As described above, as shown in FIG. 25, the system composed with the frame 21—the intermediate holding member 23—the solid state image input unit 22 according to the ninth embodiment, can be looked on as a beam with both ends fixed when it is thought as a vibration model, and it is more understandable that the system has much higher strength at the fixing portion of the solid state image input unit and the improved characteristic for vibration comparing to other types of structure when the first adhered surface A which adheres the frame 21 and the intermediate holding member 23, is formed at an intersecting point with the plane 276 which is given the line 279 extending parallely along the direction 275 which is the fixing direction of the housing 270, where the line 279 is given by selecting arbitrary two points within the respective two planes 278 which clamp the arbitrary two fixing portions 272 on the frame 21, or when the first adhered surface which adheres the frame 21 and the intermediate holding member 23, is formed with the space 277 which is given the plane 282 extending parallely along the direction 275 which is the fixing direction of the housing 270, where the plane 282 is given when the lines 281 tie between arbitrary two points on the plane 278 that clamps the frame 21 onto the housing 270 at more than three fixing portion 272.

Tenth Embodiment

Figure 26:
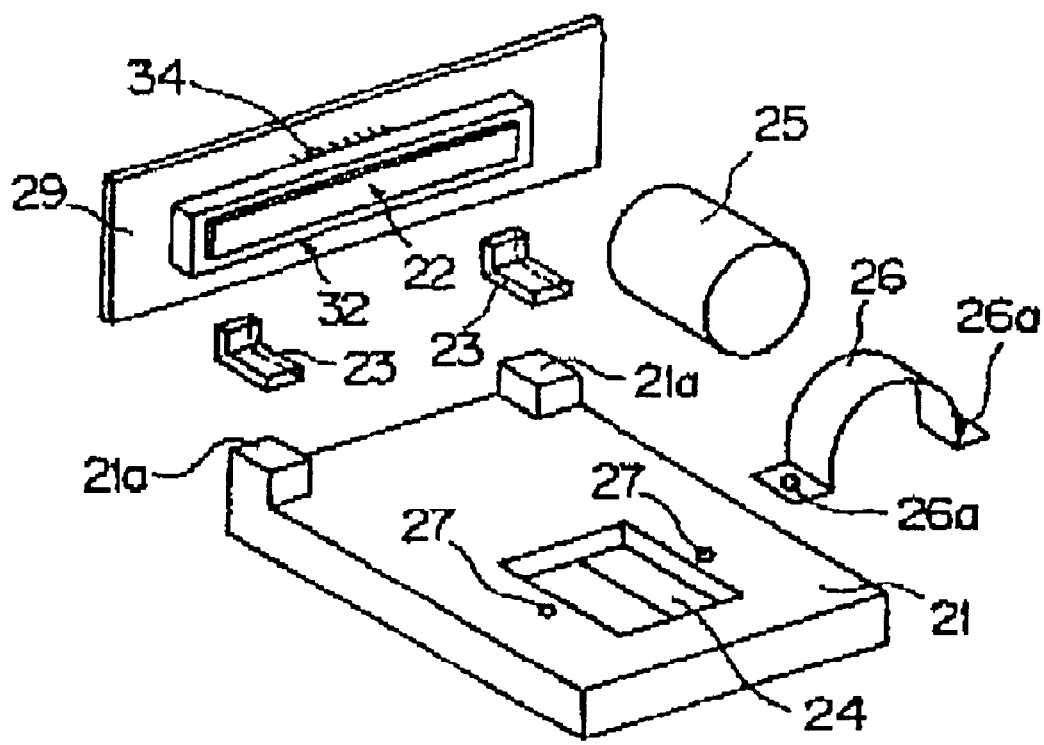
FIG. 26s are perspective views to show a tenth embodiment of the mounting structure for members of solid state image input unit according to the present invention.
FIG. 26(a) is an exploded perspective view of the mounting structure and FIG. 26(b) is a rough sketch of the perspective view of the mounting structure.
Figure 26:
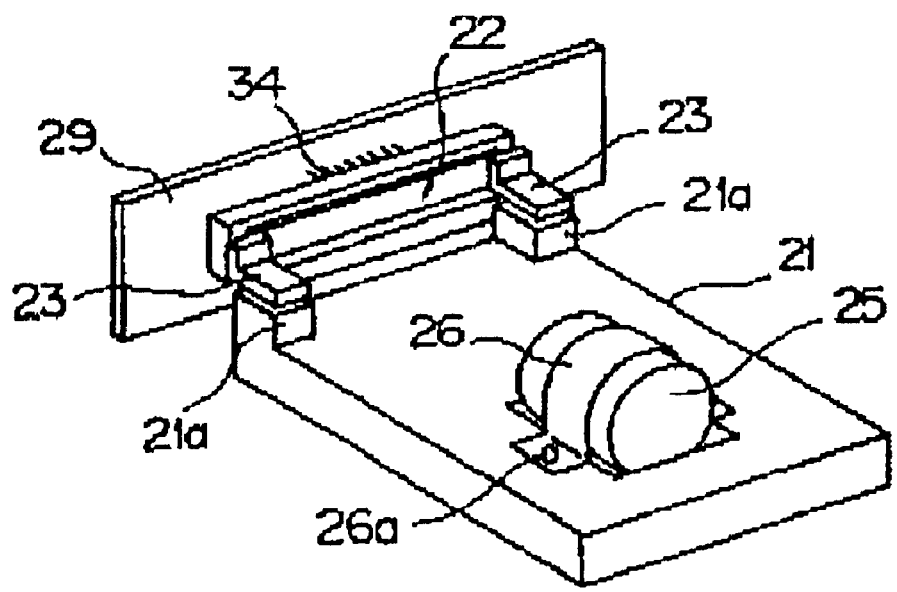
Figure 27:
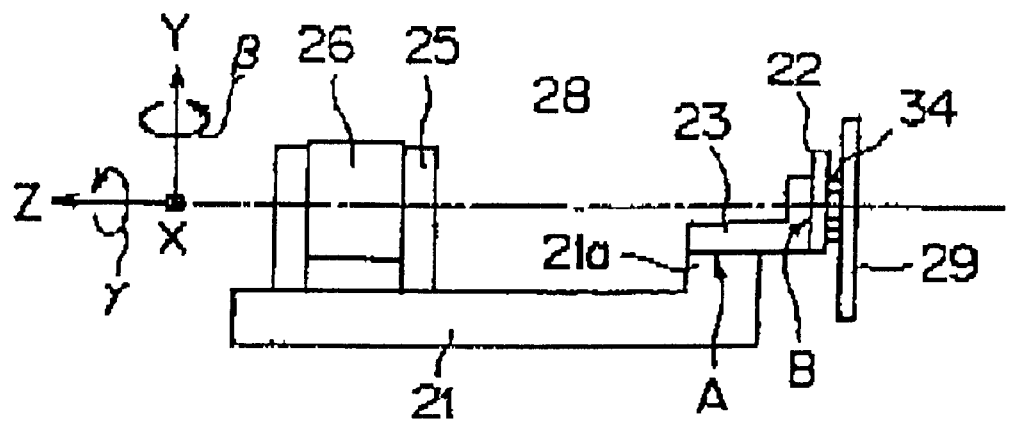
FIG. 27(a) is a elevation view of the mounting structure of tenth embodiment.
FIG. 27(b) is a elevation view to show the combined relation of the frame, the intermediate holding member and the solid state image input unit.
FIG. 27(c) is a rough sketch of front view of the solid state image input unit of it.
Figure 27:
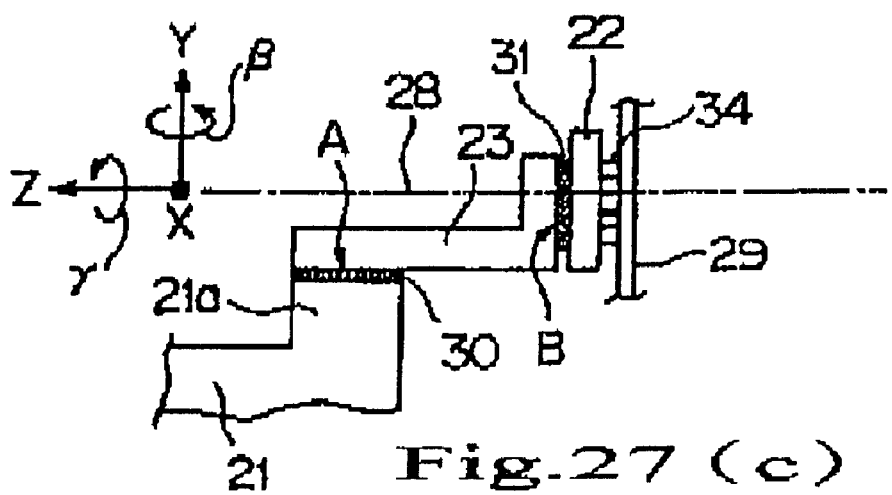
Figure 27:
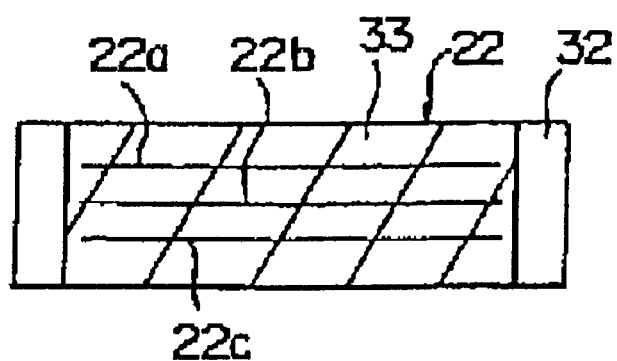
Figure 28:
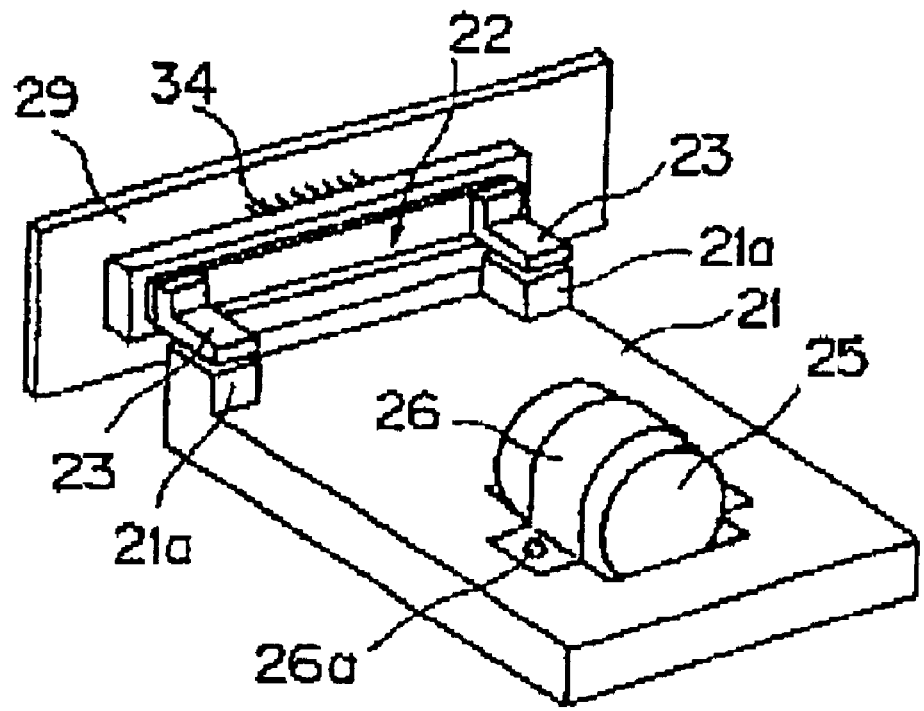
FIG. 28(a) is a perspective view of another mounting structure.
FIG. 28(b) is a perspective view of other mounting structure different from FIG. 28(a).
Figure 28:
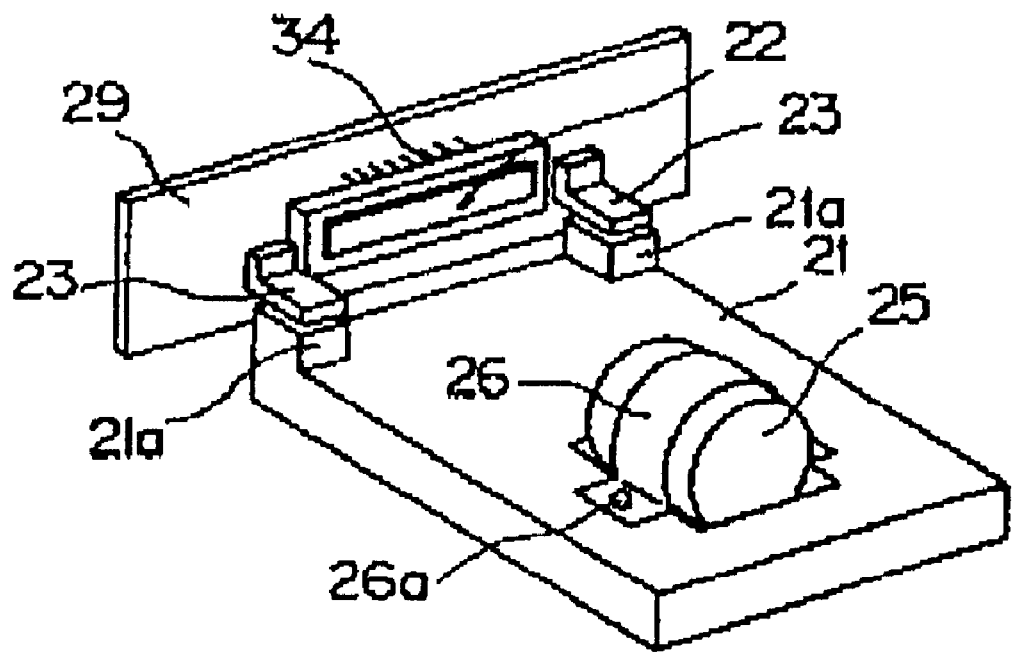

FIGS. 26–28 are views to show a tenth embodiment of the mounting structure for members and mounting apparatus for members according to the present invention, and the mounting apparatus is applied to the image read out apparatus such as a copying machine, a facsimile machine, an image scanner and so on.

Firstly, the configuration will be explained. The reference numeral 21 denotes a frame (image forming lens unit holding member) in FIGS. 26–28, and the frame 21 is formed in a plane shape.

A V shaped ditch 24 is formed in the frame 21 and a image forming lens unit 25 is located with positioning adjustment in the V shaped ditch 24. The image forming lens unit 25 is made to form an image of document on respective pixel lines 22a, 22b, 22c composed by respective solid state image input unit 22 which is combined photoelectric converting devices such as CCD aligned in every RGB respectively separated, and the lens unit is fixed on the frame 21 by a lens fixture 26. At this time, there are several screw holes 27 in the frame 21 and the lens fixture 26 is fixed on the frame 21 by means that bolts (not shown) are inserted to through holes 26a which are formed in the lens fixture 26 and they are fixed on the screw holes 27.

In the solid state image input unit 22, the pixel lines 22a, 22b, 22c including the photoelectric converting devices, are aligned in lines at a surface of main body 32 made of ceramics, and a cover glass (a portion denoted with slant lines in FIG. 27(c)) 33 is attached onto the surface of main body 32 to cover the pixel lines 22a, 22b, 22c. A pair of the intermediate holding member 23 are attached at the both ends portions other than the cover glass, and the main body 32 is supported by the intermediate holding member 23 at the horizontal portion 21a which is a projecting portion of the frame 21 so that the pixel lines 22a, 22b, 22c oppose to the image forming lens unit 25.

At this point, the reference numeral 28 denotes an optical axis in the FIG. 27, and it corresponds to a direction of Z axis. Also, X axis direction extends along a main scanning direction of the image read out apparatus, and Y axis direction extends along a secondary scanning direction.

At the back side of the main body 32, terminal 34 is disposed and an CCD circuit board 29 is attached to the terminal 34, the CCD circuit board 29 is made to drive the solid state image input unit 22 and at the same time, to output the electric signal of solid state image input unit 22 on the basis of focused optical image to the image read out apparatus after an electric process is given.

In the mean time, the intermediate holding member 23 is formed to be an L shaped of a material through which ultraviolet can pass. The intermediate holding member 23 is fixed on the surface of ceramic other than the horizontal portion 21a and the cover glass 33 respectively by an ultraviolet curing adhesive material 30, 31. The intermediate holding member 23 is arranged between the horizontal portion 21a and the ceramic surface of the main body 32 so that an adhered surface A between the horizontal portion 21a and the intermediate holding portion 23 (hereafter referred to as a first adhered surface) becomes a surface parallel to the pixel line 22a, 22b, 22c and the optical axis 28 and at the same an adhered surface B between the solid state image input unit 22 and the intermediate holding member 23 (hereafter referred to as a second adhered surface) crosses at right angle with the optical axis 28.

Hereinafter positioning adjustment method for the solid state image input unit 22 will be described.

Adhesive material 30, 31 is painted by a solid state image input unit mounting apparatus (not shown) on the two surfaces A and B of the intermediate holding member which cross at right angle each other. At this moment, after thickness of the adhesive material 30, 31 is monitored and adjusted by a camera (not shown) so that the thickness of the adhesive material become constant, the intermediate holding member 23 is attached onto the horizontal portion 21a and at the same time, the ceramic surface of main body 32 is attached to the intermediate holding member 23 by the mounting apparatus.

Then, a line image focused by the image forming lens unit 25 is located on the solid state image input unit 22, and at the same time, operations to read out the optical characteristics (focus, magnification and so on) with a predetermined accuracy is performed. At this moment the positioning adjustment of solid state image input unit 22 is achieved while the data of optical characteristics which are transformed through photoelectric conversion by the solid state image input unit 22 are monitored.

At first, when in a case to achieve positioning adjustment along X axis direction after the frame 21 is fixed on a base of the mounting apparatus, the intermediate holding member 23 is held grippingly by a chuck and so on so that the intermediate holding member 23 is made to slide on the adhesive material 30, and positioning adjustment is achieved.

Further, when in a case to achieve positioning adjustment on β axis around Y axis, the intermediate holding member 23 is held grippingly by a chuck and so on so that the intermediate holding member 23 is made to slide on the adhesive material 30.

Also, when in a case to achieve positioning adjustment along Y axis direction, the CCD circuit board 29 and the intermediate holding member 23 is held grippingly by a chuck and so on so that both of the solid state image input unit 22 and the intermediate holding member 23 are made to slide at the same time, on the adhesive material 31.

In addition, when in a case to achieve positioning adjustment along Z axis direction, the intermediate holding member 23 is held grippingly by a chuck and so on so that the solid state image input unit 22 is made to slide at the same time, on the adhesive material 30.

Moreover, when in a case to achieve positioning adjustment on γ axis around Z axis, the CCD circuit board 29 and the intermediate holding member 23 are held grippingly by a chuck and so on so that the solid state image input unit 22 and the intermediate holding member 23 are made to slide on the adhesive material 31.

In this embodiment, the respective motions of X, Y, Z, β and γ can be independently performed for every axis, and the sliding motions to adjust the intermediate holding member 23 and the solid state image input unit 22 can he agreed with the Cartesian coordinate direction because the intermediate holding member 23 is arranged between the frame 21 and the sold state image input unit 22 so that the first adhered surface A and the second adhered surface B crosses at right angle.

At this time, the reason why an adjustment of rotational axis around X axis is not performed is that the distances between the image forming lens unit 25 and respective pixels of the solid state image input unit 22 become not different without adjustment around X axis even when the adjustment around the X axis is not performed, because the X axis is located along (in parallel to) a direction of the line of pixels 22a–22c in comparison with that the adjustments around the β axis and γ axis cause deteriorate the accuracy of optical characteristics because the distances between the image forming lens unit 25 and respective pixels of the solid state image input unit 22 become different when the adjustment of the β axis and γ axis around the Y axis and Z axis are not performed.

As described above, the positioning adjustment of solid state image input unit 22 is performed and when a judgement that the optical characteristics get satisfied a level within the predetermined accuracy, has been made through output from the monitor, the adhesive materials 30, 31 are hardened all at once with an irradiation of the ultraviolet through the intermediate holding member 23 from vertical directions to the surfaces to be adhered at all area to be adhered of the adhesive materials 30, 31, by an ultraviolet irradiating light (not shown).

As described above, in this embodiment because the intermediated holding member 23 is arranged so that the first adhered surface A between the frame 21 and the intermediate holding member 23 is parallelized with the pixel line 22a–22c of solid state image input unit 22 and the optical axis 28 and at the same time, the surface of solid state image input unit 22 and the second adhered surface B cross with right angle the positioning adjustment only in the direction along the five direction of X, Y, Z, β and γ axes can be easily achieved and the positioning adjustment in a direction around X axis is actively not performed.

In addition, the mounting of solid state image input unit 22 is performed with high precision and yield of the process can get higher by means that thickness of the adhesive materials 30, 31 which are applied to the first adhered surface A and the second adhered surface B are controlled in the minimum requirement and constant value, and a positional accuracy of portions of solid state image input unit 22 and frame 21 do not have to be strictly controlled because the intermediate holding member 23 is equipped between the solid state image input unit 22 and the frame 21, and at the same time, it can be prevented that an occurrence of deterioration in a fixing forth of the solid state image input unit 22 after the solid state image input unit has been completed (after the adhesive material is hardened).

A time required to harden the adhesive materials 30, 31 can be shortened and a productivity can be increased because the adhesive material 30, 31 are selected from ultraviolet adhesive materials and the intermediate holding member 23 is made of a material which can pass ultraviolet through so that the ultraviolet can be irradiate onto the ultraviolet curing adhesive material through the intermediate holding member 23, and the ultraviolet can be irradiated all at once onto all of the adhered surfaces through the intermediate holding member 23 from vertical directions.

At this point, the thickness of adhesive material 30, 31 are the thinner the better in order to decrease an influence of the shrinkage when hardened. However, it actually happens a necessity that the thickness are arranged to cover a difference between concavity and conversity of the surface in accordance with the flatness of the solid state image input unit 22.

Though the intermediate holding member 23 is mounted at the both ends portions of the main body 32 other than cover glass 33, the intermediate holding member 23 may be mounted at the back side of main body 32 without limiting only to the front side. In such a case, a holding surface of the intermediate holding member 23 which is shown in FIG. 26(a) is put between the CCD circuit board 29 and the main body 32.

In addition, the intermediate holding member 23 may be mounted at the both ends portions of cover glass 88 as shown in FIG. 28(a) and the intermediate holding member 23 may be mounted on the surface of the CCD circuit board 29 as shown in FIG. 28(b). In such case, it is needless to say that the same effect can be attained as the streetcars described above.

Eleventh Embodiment

Figure 29:
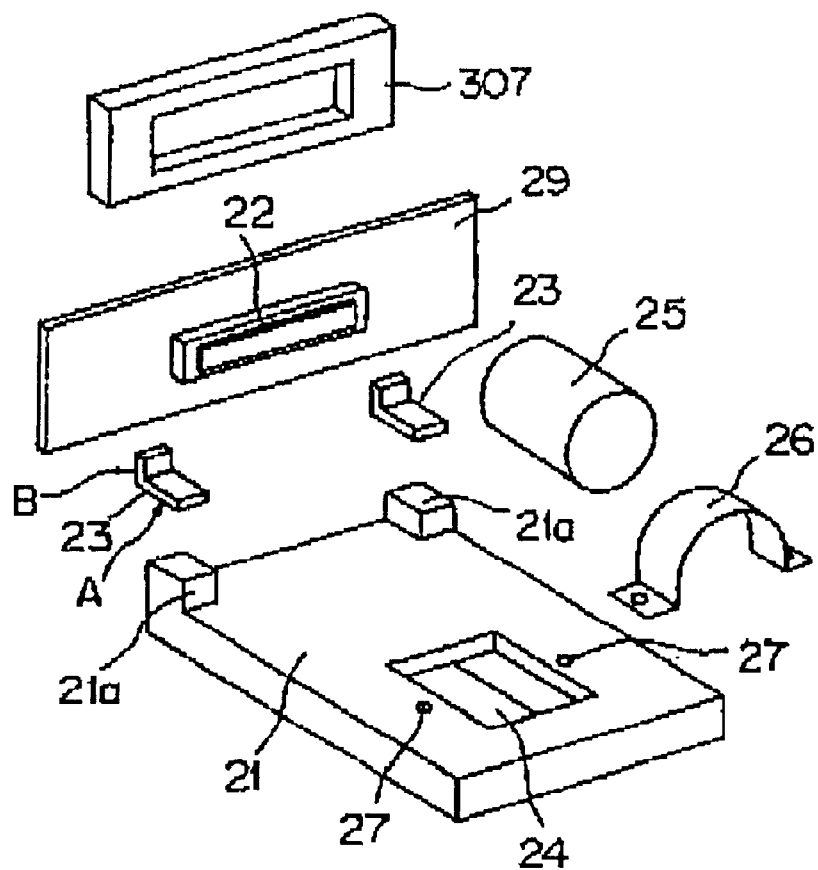
FIG. 29 is an exploded perspective view to show one example of mounting structure for solid state image input unit according to eleventh embodiment of the present invention.
Figure 30:
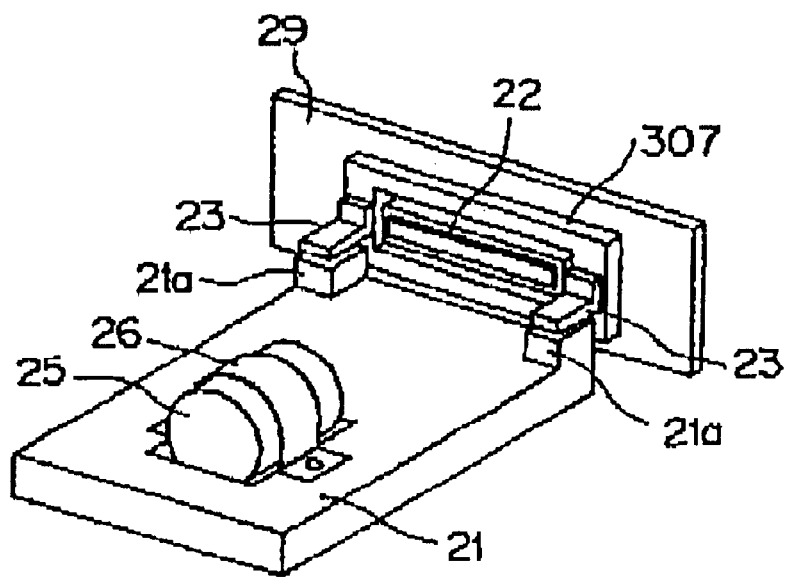
FIG. 30 is an exploded perspective view to show another example of mounting structure for solid state image input unit according to eleventh embodiment of the present invention.

FIGS. 29–30 are views to show an eleventh embodiment of mounting structure for members and mounting apparatus for members according to the present invention, and the mounting apparatus is applied to a mounting apparatus for the solid state image input unit.

FIG. 29 is an exploded perspective view to show one example of mounting structure for solid state image input unit according to eleventh embodiment of the present invention, and FIG. 30 is an exploded perspective view to show another example of mounting structure for solid state image input unit according to eleventh embodiment of the present invention. This mounting structure is applied to the image read out apparatus such as a copying machine, a facsimile machine, an image scanner and so on.

At first, a configuration of parts of the mounting apparatus to which the mounting structure is applied.

The mounting apparatus of solid state image input unit 22 includes an image forming lens unit 25, an intermediate holding member 23 having a structure in which a first adhered surface A and a second adhered surface B are arranged with right angle each other and both parallel to the pixel line, a CCD circuit board 29 on which the solid state image input unit 22 is held, a frame 21 to hold the forming lens unit having a ditch 24 in which the image forming lens unit 25 is mounted on, and screw holes by which a lens holding fixture 26 is fixed, and two adhering surfaces for the pixel lines including the photoelectric converting devices of solid state image input unit 22 and a horizontal plane 21a which is parallel to the optical axis, at the opposite side of image forming lens unit 25 located, a lens holding fixture 26 and a spacer 307 to be fixed with a detachable means onto the CCD circuit board 29. The shape of spacer 307 is a one body shape which is connected in a plurality of portions as shown in FIGS. 29 and 30.

The aforesaid frame 21 and the spacer 307 are made of materials whose coefficient of line expansion is the same each other, and the rigidity of a material for the CCD circuit board 29 is weaker than that for the spacer 307.

According to the embodiment shown in FIGS. 29 and 30 even when an environmental temperature change happens, an amount of elongation by thermal expansion are the same because the coefficient of materials for those are the same and no stress is induced between the two adhered surfaces on the intermediate holding member 23, since, no peeling off occurs. There happens a difference of amount of elongation between the CCD circuit board 29 and the spacer 307 because the coefficient of line expansion for these are not equal, however reliability of adhesive strength between the frame 21 and the spacer 307 can be maintained because the rigidity of the CCD circuit board 29 is weaker than that of the spacer 307 and CCD circuit board 29 follows the amount of elongation of the spacer 307 and the position of solid state image input unit 22 is not changed.

Figure 31:
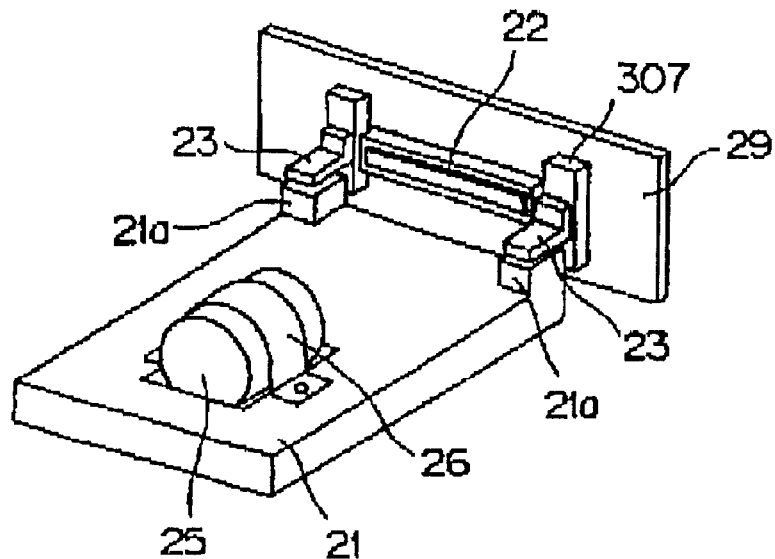
FIG. 31 is an exploded perspective view to show other example of mounting structure for solid state image input unit according to eleventh embodiment of the present invention.

FIG. 31 is a perspective view to show another example according to the eleventh embodiment.

In the example of FIG. 31, the same reference numeral is given to the same portion as the example of FIG. 30 and detailed explanation will be omitted.

The spacer 307 is composed of plurality of portions which are adhered together as shown in FIG. 31. And, aforesaid frame 21 and the spacer 307 are made of materials whose coefficient of the line expansion is the same.

According to the configuration of this embodiment, even when an environmental temperature change happens, an amount of elongation by thermal expansion are the same because the coefficient of materials for those are the same and no stress is induced between the two adhered surfaces on the intermediate holding member 23, since, reliability of adhesive strength between the frame 21 and the CCD circuit board 29 can be maintained.

The spacer 307 is composed of plurality of portions which are adhered together as shown in FIG. 31, and the frame 21 and the CCD circuit board 29 are made of materials whose coefficient of the line expansion is different, moreover the rigidity of CCD circuit board can be weaker than that of the frame.

According to the configuration of this embodiment, when an environmental temperature change happens, an amount of elongation by thermal expansion becomes different because the coefficient of materials for those are different. However, because the rigidity of the CCD circuit board 29 is weaker than that of the frame 21, and CCD circuit board 29 follows the amount of elongation of the frame 21 and the position of solid state image input unit 22 is not changed. And the reliability of adhesive strength between the frame 21 and the CCD circuit board 29 can be maintained.

Figure 32:
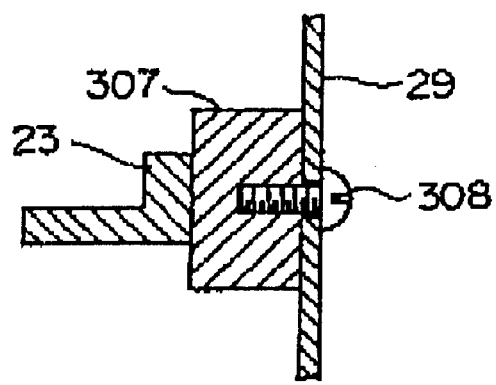
FIG. 32 is a cross sectional view to show a first example of mounting structure of a circuit board and a spacer of the eleventh embodiment of the present invention.
Figure 33:
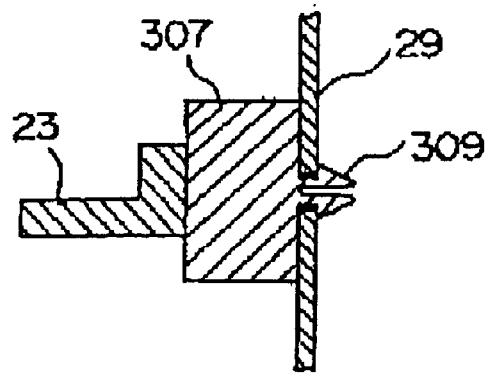
FIG. 33 is a cross sectional view to show a second example of mounting structure of a circuit board and a spacer of the eleventh embodiment of the present invention.
Figure 34:
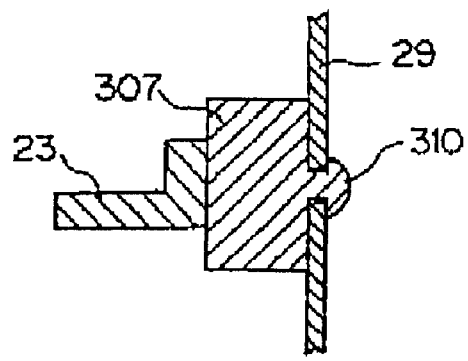
FIG. 34 is a cross sectional view to show a third example of mounting structure of a circuit board and a spacer of the eleventh embodiment of the present invention.

FIGS. 32–34 are cross sectional views to show examples of mounting structure of CCD circuit board 29 and spacer 307 of the eleventh embodiment.

In this mounting structure the CCD circuit board 29 and the spacer 307 are mounted with screws 308 as shown in FIG. 32.

According to this mounting structure even when defective product is made in the mounting process for solid state image input unit by any possibility, the CCD circuit board 29 including the solid state image input unit 22 can be removed from the spacer 307 and it can be reutilized by means that the fixing screws 308 by which the spacer 307 is mounted on the CCD circuit board 29, are loosened.

As shown in FIG. 33 in the mounting structure, CCD circuit board 29 and the spacer 307 can be fixed by means of a push pin 309

According to this mounting structure, even when defective product is made in the mounting process for solid state image input unit by any possibility, the CCD circuit board 29 including the solid state image input unit 22 can be removed from the spacer 307 and it can be reutilized by means that the push pins 309 by which the spacer 307 is mounted on the CCD circuit board 29, are removed.

As shown in FIG. 34 in the mounting structure CCD circuit board 29 and the spacer 307 can be fixed by means of a thermal fusion bond portion 310.

According to this mounting structure, even when defective product is made in the mounting process for solid state image input unit by any possibility, the CCD circuit board 29 including the solid state image input unit 22 can be removed from the spacer 307 and it can be reutilized by means that the thermal fusion bond portion 310 by which the spacer 307 is mounted on the CCD circuit board 29, are cut.

Twelfth Embodiment

Figure 35:
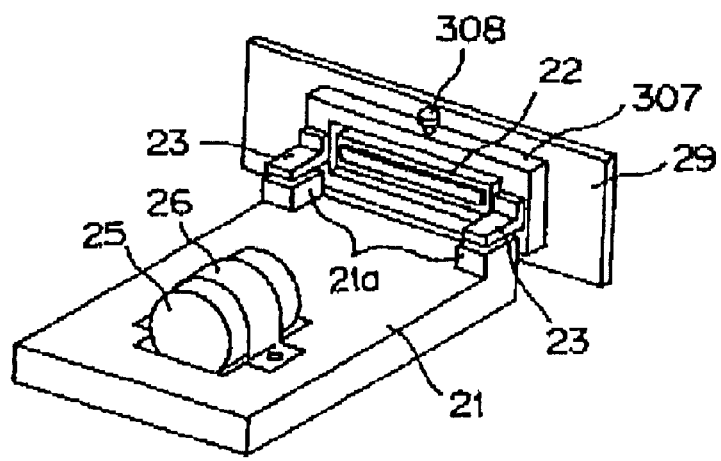
FIG. 35 is a perspective view to show one example of mounting structure for solid state image input unit according to twelfth embodiment of the present invention.
Figure 36:
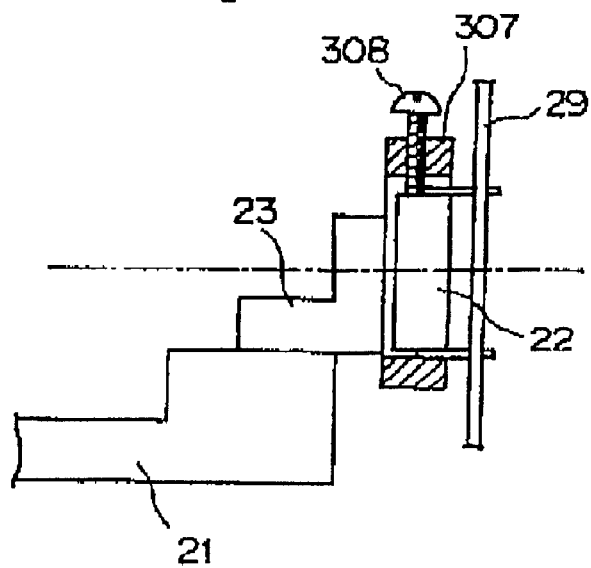
FIG. 36 is a enlarged view of the relevant part of FIG. 35.
Figure 37:
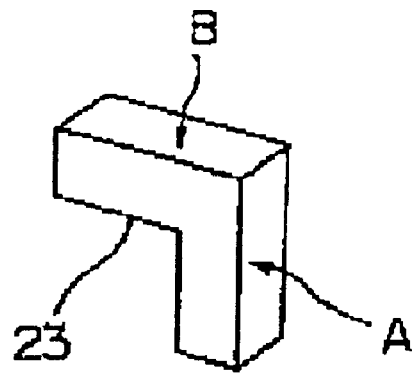
FIG. 37 is a perspective view of the intermediate holding member utilized in an embodiment shown in FIGS. 35 and 36.

FIGS. 35–37 are views to show a twelfth embodiment of mounting structure for members and mounting apparatus for members according to the present invention, and the mounting apparatus is applied to a mounting apparatus for the solid state image input unit.

The twelfth embodiment is different from the above described embodiment of FIGS. 29, 30 at portion of the spacer and other configuration is quite the same.

The spacer 307 is arranged so as to circumscribe the solid sate image input unit 22 with its through hole and fixed onto the solid state image input unit 22 by a fixing screw 308 which is detachable. The spacer 307 and the intermediate holding member 23 are adhered together as well as the structure shown in FIG. 29 and FIG. 30. In this embodiment the frame 21, spacer 307 and the intermediate holding member 23 are made of material whose coefficient of line expansion is the same.

FIG. 37 shows an intermediate holding member which is the same kind of the intermediate holding member utilized in the structure of FIG. 29 and FIG. 30.

According to this mounting structure, even when defective product is made in the mounting process for CCD circuit board 29 including the solid state image input unit 22 by any possibility, the CCD circuit board 29 including the solid state image input unit 22 can be removed from the spacer 307 and it can be reutilized by means that the fixing crews 308 by which the spacer 307 is mounted on the CCD circuit board 29, are loosened.

Further, this structure also has a merit that even when an environmental temperature change happens, no stress is induced between the adhered surfaces and no peeling off occurs, since, reliability of adhesive strength can be maintained.

According to this mounting structure, even when the required characteristics are not satisfied after positioning adjustment for the intermediate holding member 28 and the frame 21, and for the intermediate holding member 23 and the spacer 307 are performed and they are fixed by hardening at the mounting process for the solid state image input unit the CCD circuit board 29 including the solid state image input unit 22 can be removed from the spacer 307 and it can be reutilized by means that the fixing screws 308 by which the spacer 307 is mounted on the CCD circuit board 29, are loosened as shown in FIG. 36.

Thirteenth Embodiment

FIGS. 38–41 are views to show a thirteenth embodiment of mounting structure for members and mounting apparatus for members according to the present invention, and the mounting apparatus is applied to a mounting apparatus for the solid state image input unit.

Figure 38:
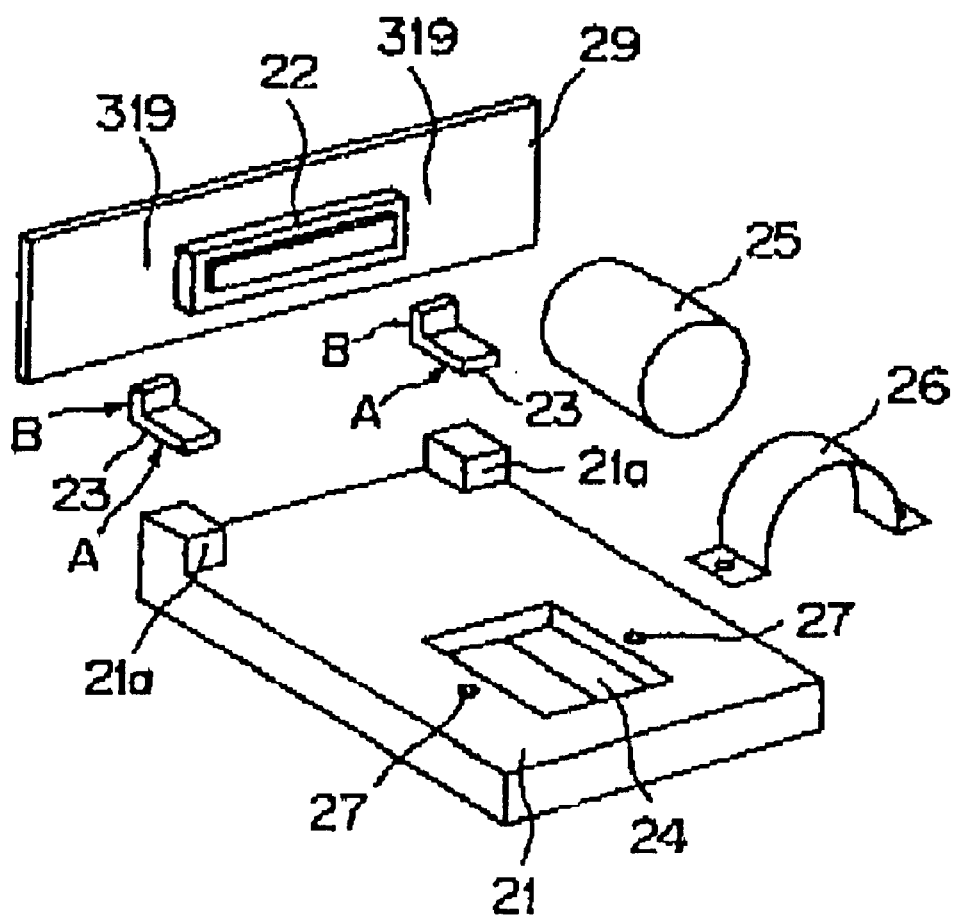
FIG. 38 is an exploded perspective view to show one example of mounting structure for solid state image it unit according to thirteenth embodiment of the present invention.
Figure 39:
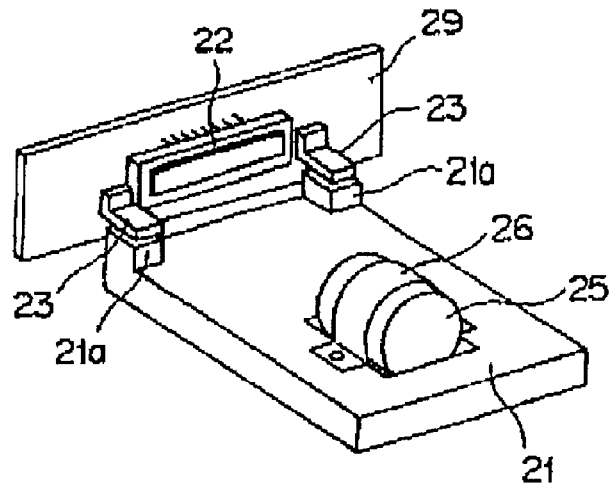
FIG. 39 is a perspective view to show one example of mounting structure for solid state image input unit according to thirteenth embodiment of the present invention.

FIGS. 38 and 39 are views to show the thirteenth embodiment, FIG. 38 is an exploded perspective view and FIG. 39 is a perspective view. Also, FIG. 40 is an enlarged perspective view of circumference of tie solid state image input unit and FIG. 41 is a front view of the solid state image input unit.

The thirteenth embodiment is different from the above described embodiment of FIGS. 29, 30 at portion of an adhesion of the intermediate holding member and other configuration is quite the same.

Figure 40:
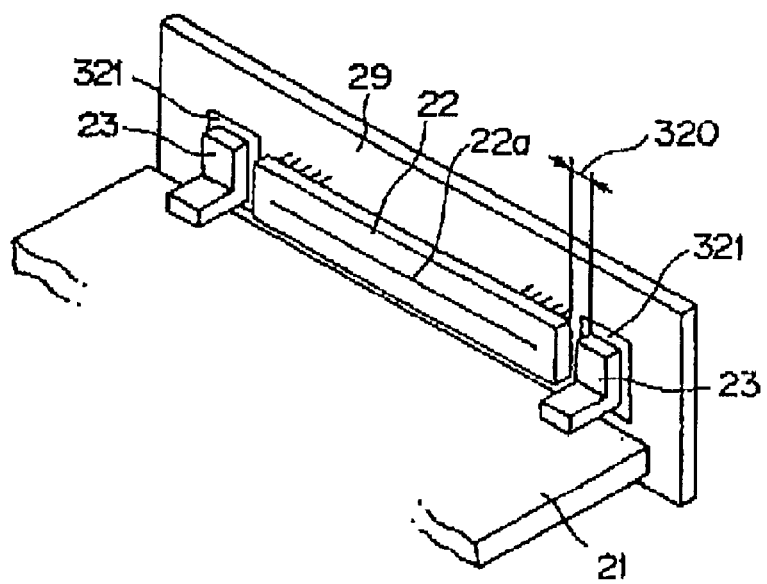
FIG. 40 is an enlarged perspective view of circumference of the solid state image input unit shown in FIGS. 38 and 39.

This embodiment is characterized by that the adhered portion of the CCD circuit board 29 are located on a line extending from the pixel lines and at a point which is apart a length of adjustment space 320 of the solid state image input unit 22 from the end portion of solid state image input unit as shown in FIGS. 38–40.

Figure 41:
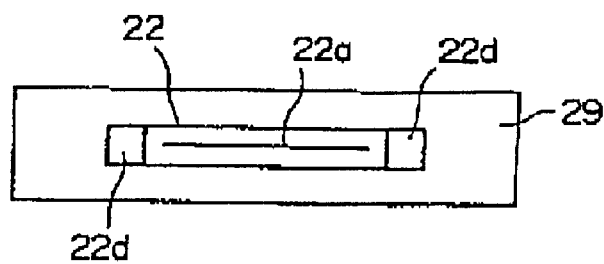
FIG. 41 is a front view of one example of the solid state image input unit mounted on a substrate.

The intermediate holding member 23 which is utilized to adhere the CCD circuit board 29, is located on a line extending from the pixel line and at a point where the length of adjustment space 320 of the solid state image input unit 22 can be secured as shown in FIG. 40, and FIG. 41.

Moreover, the adhering surface of the CCD circuit board 29 is made as a solder coated surface 321 and the solder coated surface 321 is located at a position where the intermediate holding member 23 is disposed, and the area around it is made to secure the length of adjustment space for solid state image input unit 22 in both the main scanning direction and the secondary scanning direction. In the drawing the reference numeral 22d denotes an adhering position.

Figure 42:
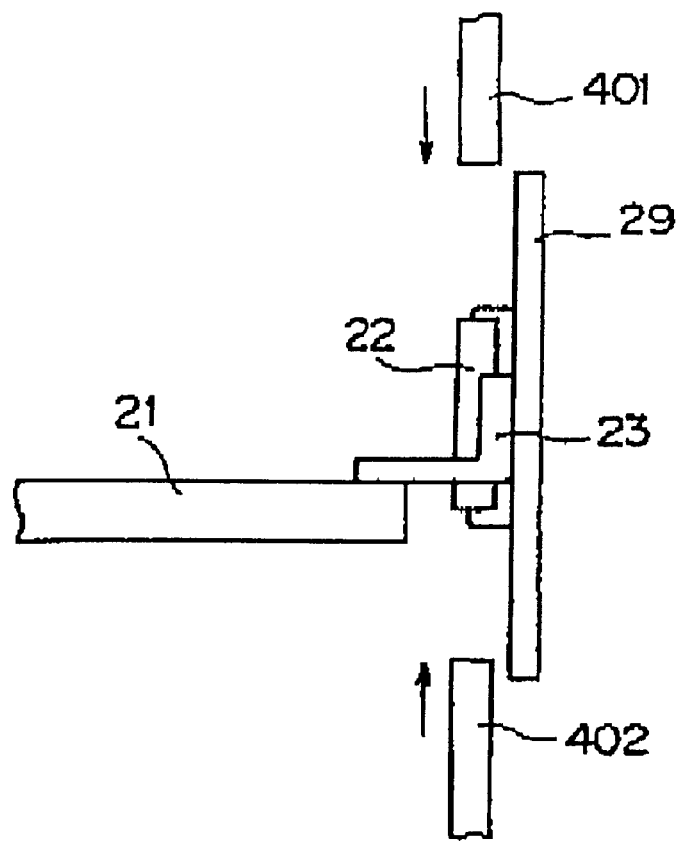
FIG. 42 is a structural diagram to hold the solid state image input unit.
Figure 43:
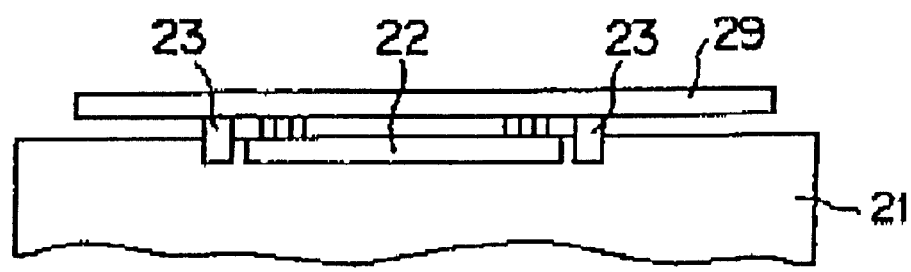
FIG. 43s are elevation views to show an effect of the mounting structure for solid state image input unit of the thirteenth embodiment.
Figure 43:
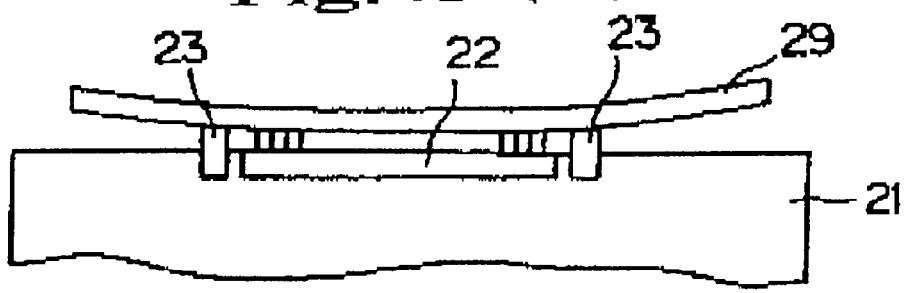

When the solid state image input unit 22 is adjusted, there is a necessity to hold it. FIG. 42 is a structural diagram to hold the solid state image input unit.

When the portion of the image forming lens unit 25 and the solid state image input unit 22 which are fixed on the frame 21 are adjusted so as to secure the required optical characteristics, the adjustment is achieved with holding the solid state image input unit 22 and moving a position of the solid state image input unit 22. At the time, chuck portions 401, 402 which are not shown in the drawing and equipped in the CCD position adjusting machine, hold the solid state image input unit 22.

According to this embodiment, even when the CCD circuit board 29 deforms due to thermal shock or mechanical vibration, the effect of deformation does not occur at the position of pixel in the solid state image input unit 22 and the required optical characteristics are secured because the adhering position of the CCD circuit board 29 is located along a line extending from the pixel line of the solid state image input unit 22 at a vicinity of the end portion of solid state image input unit.

Figure 44:
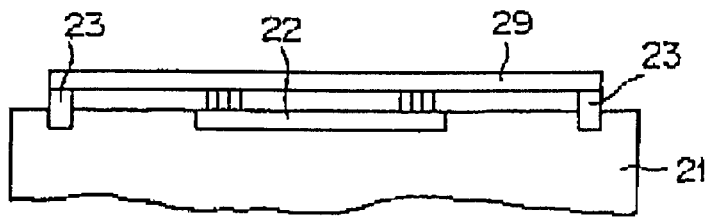
FIG. 44s are elevation views to show an effect of the mounting structure for solid state image input unit of a referential embodiment.
Figure 44:
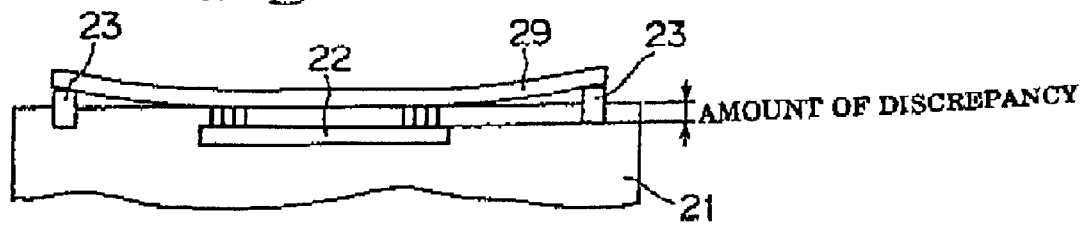

On the contrary in a structure shown in FIG. 44 when the CCD circuit board 29 deforms due to thermal shock or mechanical vibration, the effect of deformation does occur at the position of pixel in the solid state image input unit 22 and the required optical characteristics are not secured because the adhering position of the CCD circuit board 29 is located far from an end of the solid state image input unit as shown in FIG. 44.

Figure 45:
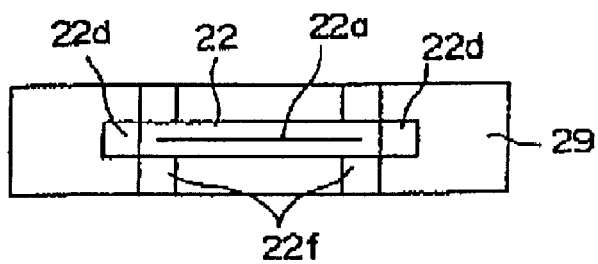
FIG. 45 is a front view to show another example of the solid state image input unit mounted on the substrate.
Figure 46:
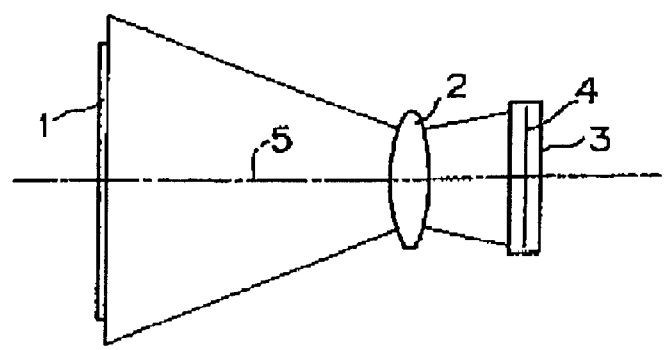
FIG. 46 is a plan view to show an optical positional relation between the a material body, the image forming lens unit and the solid state image input unit in the prior art technology.
Figure 47:
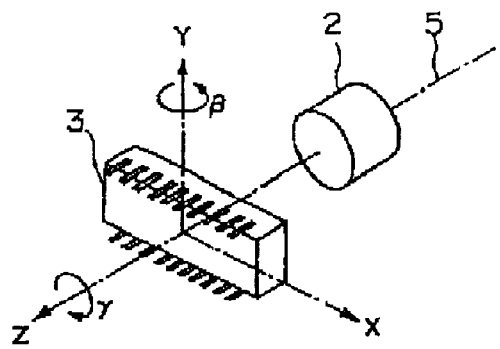
FIG. 47 is a perspective view to show a five axes coordinate of the solid state image input unit and the image forming lens unit.

FIG. 45 is a front view to show another example of the solid state image input unit mounted on the substrate. In the drawing the reference numeral 22f denotes portions in which a mounting height is less than 1 (one) mm.

Fourteenth Embodiment

In the mounting for integrated circuit it is well known what made of ceramics and utilized mainly for industrial products as dual in line package (hereinafter referred to as DIP) and what made of plastic and utilized for consumer products.

The DIP made of ceramics is further classified into the ceramics DIP of burnt type and CerDIP of glass sealed. The CerDIP of glass sealed has a merit of production cost because it needs less man power in the production line in comparison with the ceramics DIP, since solid state image input unit of CerDIP type is required to make better use.

At first, a fundamental configuration of the solid state image input unit of CerDIP type will be explained.

Figure 51:
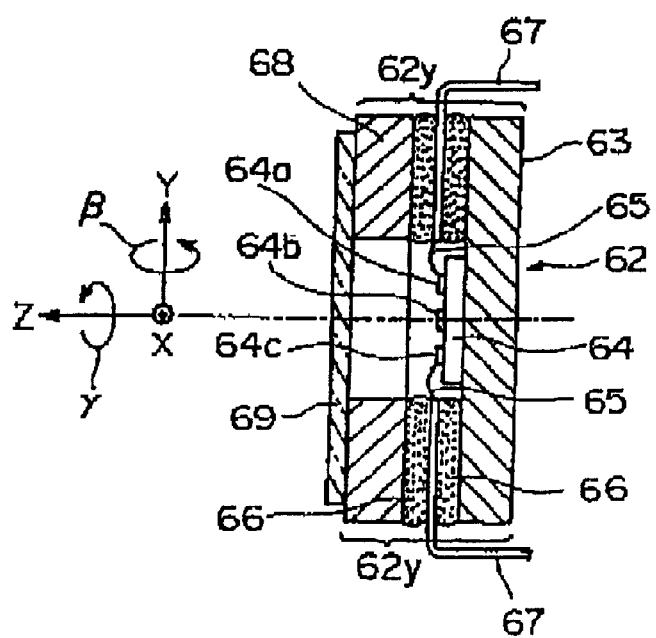
FIG. 51 is a cross sectional view to show a fundamental structure of the CerDIP type solid state image input unit.

FIG. 51 is a cross sectional view to show a fundamental configuration of the CerDIP type solid state image input unit.

A fundamental configuration of CerDIP type solid state image input unit 62 includes a base 63 made of ceramics, a semiconductor chip 64 mounted on the base 63, pixel lines 64a, 64b, 64v formed on the semiconductor chip 64, lead frame 67 bonded to the base 63 by sealing glass 66, lead wire 65 connecting between the lead frame 67 and the semiconductor chip 64 with wire bonding, wind frame 68 bonded on the base 63 via the sealing glass 66, and cover glass 69 adhered on the wind frame 68 to seal the semiconductor chip 64 as shown in FIG. 51.

Next, the fourteenth embodiment of the mounting structure for members and mounting apparatus for members according to the present invention with one sample of mounting structure for the CerDIP type solid state image input unit 62 which has the fundamental configuration described above.

Figure 52:
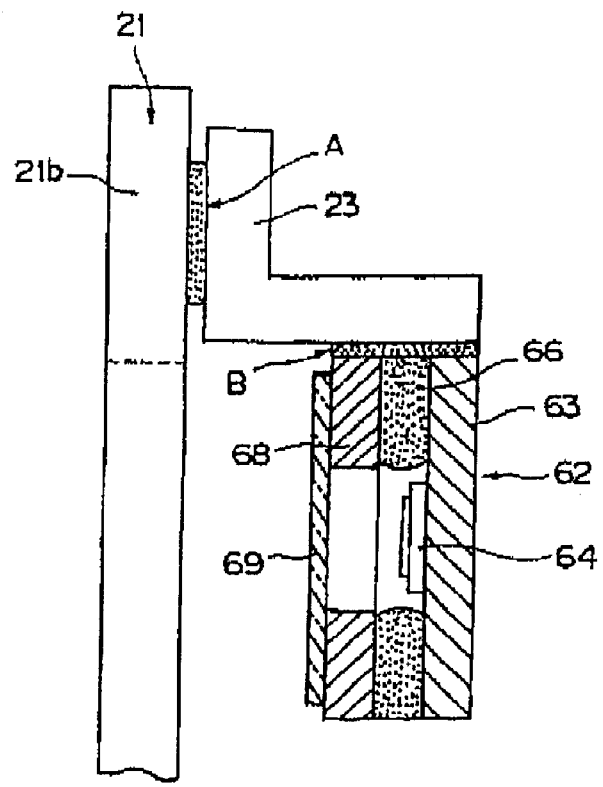
FIG. 52 is a cross sectional view to show one example of the mounting structure for members of the solid state image input unit according to a fourteenth embodiment of the present invention.

FIG. 52 is a cross sectional view to show one example of the mounting structure for members of the solid state image input unit according to a fourteenth embodiment of the present invention.

As shown in FIG. 52 the mounting structure for members of CerDIP type solid state image input unit 62 of the fourteenth embodiment is to mount and fix a CerDIP type solid state image input unit 62 as the second member and the intermediate holding member 23 on a frame 21 as the first member. In other words, the first adhered surface A is constituted by a side surface of the CerDIP type solid state image input unit 62 and a lower surface of the intermediate holding member 23.

In this fourteenth embodiment the base 63, sealing glass 66 and the wind frame 68 of the CerDIP type solid state image input unit 62 have common surface with substantially same height and they are adhered onto the intermediate holding member 23.

The lens frame 67 and the lead wire 65 are omitted in the drawing because as the first adhered surface A on which the intermediate holding member 23 is adhered, a surface without lead frame 67 is selected from surfaces of the CerDIP tape solid state image input unit 62.

Fifteenth Embodiment

Figure 53:
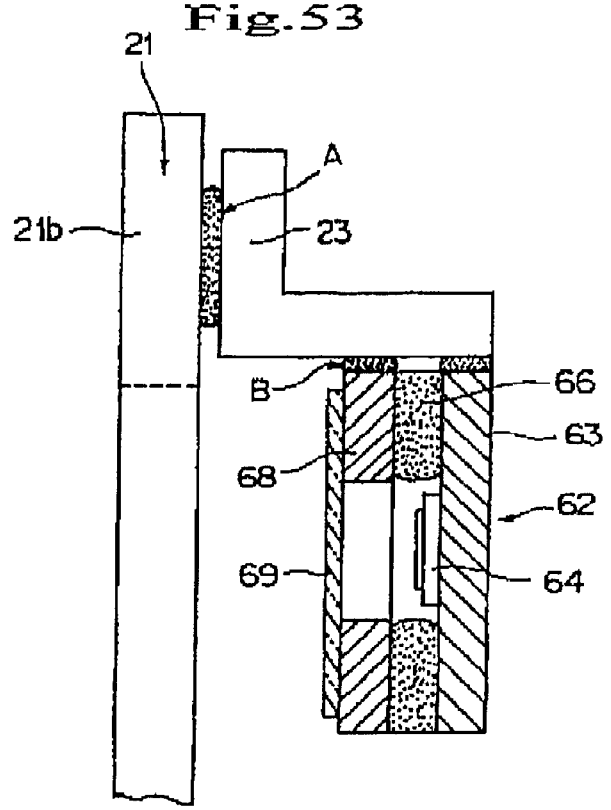
FIG. 53 is a cross sectional view to show one example of mounting structure of the CerDIP type solid state image input unit according to a fifteenth embodiment of the present invention.

FIG. 53 is a cross sectional view to show one example of mounting structure of the CerDIP type solid state image input unit according to a fifteenth embodiment of the present invention.

As shown in FIG. 53 the adhesion may be achieved only at the base 63 and the wind frame 68 other than the sealing glass 66.

Sixteenth Embodiment

FIG. 54s are cross sectional views to show one example of mounting structure of the CerDIP type solid state image input unit according to a sixteenth embodiment of the present invention, FIG. 54(a) shows an example in which the intermediate holding member is adhered in a portion of base side, FIG. 54(b) shows an example in which the intermediate holding member is adhered in a portion of wind frame side.

Figure 54:
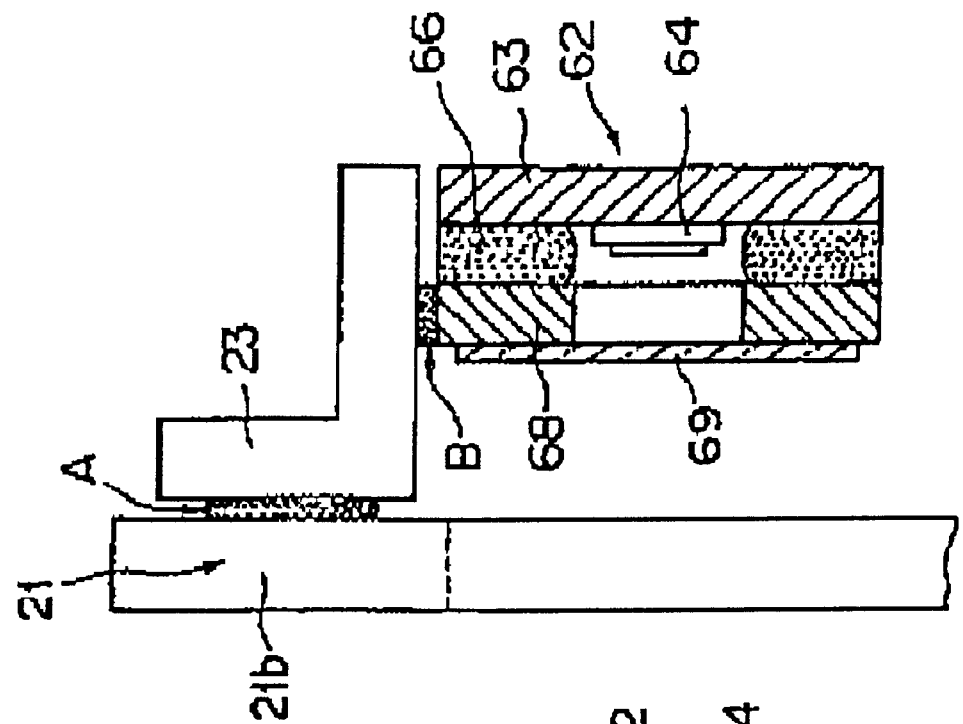
FIG. 54s are cross sectional views to show one example of mounting structure of the CerDIP type solid state image input unit according to a sixteenth embodiment of the present invention.
FIG. 54(a) shows an example in which the intermediate holding member is adhered in a portion of base side.
FIG. 54(b) shows an example in which the intermediate holding member is adhered in a portion of wind frame side.
Figure 54:
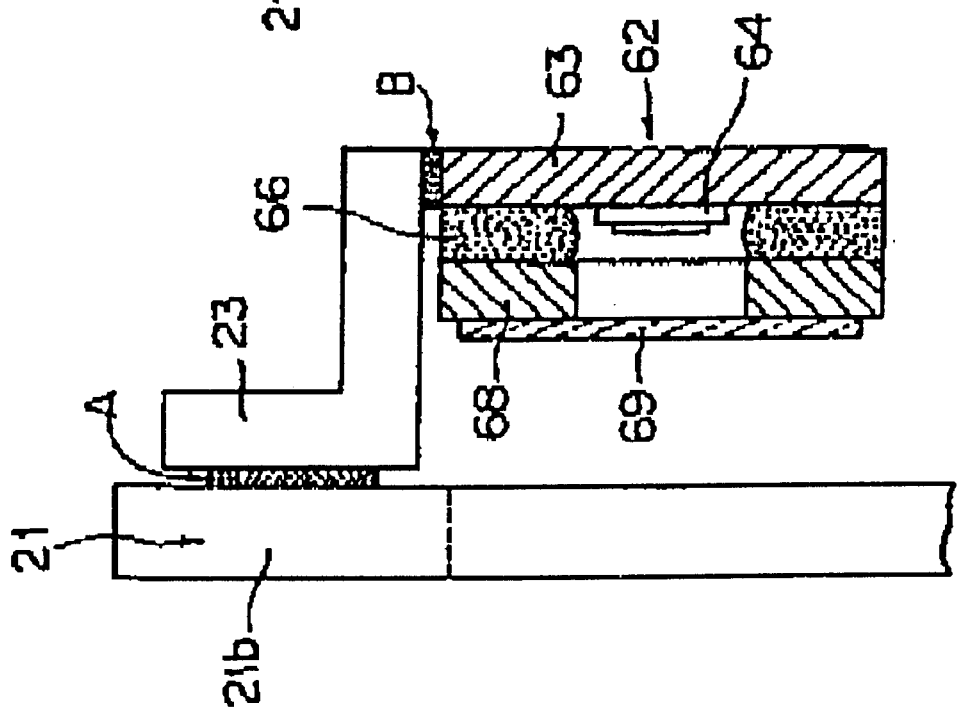

As shown in FIG. 54 when a product specification requires or no wider adhering space is not required, the adhesion can be attained only at a portion of the base 63 as shown in FIG. 54(a) or at a portion of the wind frame 68 as shown in FIG. 54(b).

Seventeenth Embodiment

FIG. 55s are cross sectional views to show one example of mounting structure of the CerDIP type solid state image input unit according to a seventeenth embodiment of the present invention, FIG. 55(a) shows an example of a case in which a base protrudes from other portions, FIG. 55(b) shows an example of a case in which a wind fame protrudes from other portions, and FIG. 55(c) shows a example of case in which the base and the wind frame protrude with constituting a surface from other portions.

As shown in FIG. 55 a protruding state of side surfaces (that is dimensions of each parts in Y direction) in the vertical direction of the base 63, sealing glass 66 and the wind frame 68 does not relate to the performance of the CerDIP type solid state image input unit 62 and it can be arbitrary. In other words, the side surface of the solid state image input unit does not need to form a simple surface with the same height (that is no need to be a one plane).

As shown in FIG. 55(a) when in a case only a portion of the base 63 protrudes from other portions in length of Δl (amount of protruding is arbitrary), the intermediate holding member 23 is adhered only with the base 63.

As shown in FIG. 55(b) when in a case only a portion of the wind frame 68 protrudes from other portions in length of Δl (amount of protruding is arbitrary), the intermediate holding member 23 is adhered only with the wind frame 68.

As shown in FIG. 55(c) when in a case portions of the base 63 and the wind frame 68 are almost the same height (to constitute a same surface) but protrudes from the portion of sealing glass 66 in length of Δl (amount of protruding is arbitrary), the intermediate holding member 23 is adhered with the base 63 or with the wind frame 68, or adhered with both of the base 63 and the wind frame 68 as shown in the drawing. However, in this embodiment, when the product specification requires wider space, the more space can be realized by means that the intermediate holding member 28 is extended in X direction (direction vertical to the paper surface). In like wise in the examples shown in FIGS. 52–54, when the adhering space is deficient, wider adhering space can be realized by extending it in X direction according to its need.

The above described fourteenth embodiment to seventeenth embodiment are characterized by that the structure of the solid state image input unit 62 is composed with plate materials (base 63, wind frame 68) and sealing material 1f laminated along a direction the optical image coming (the optical axis direction 21) in a manner the sealing material being arranged between the base materials, and the second adhered surface B is at least one of the most protruding end surface of laminated surface (side surface 62y) of the solid state image input unit 62.

Moreover, the fourteenth embodiment to seventeenth embodiment are characterized by that the solid state image input unit is a kind of CerDIP type solid state image input unit 62 (that is the plate materials (base 63, wind frame 68) are made from ceramics and the sealing material is made from sealing glass 66).

Further, the fourteenth embodiment is characterized by that the second adhered surface B is composed with all the plate materials (base 63, wind frame 68) and the sealing glass 66.

Further, more the fifteenth embodiment to seventeenth embodiment are characterized by that the second adhered surface B is composed with only the plate materials (base 63, wind frame 68 or base 63 and wind frame 68).

Further, more the fifteenth embodiment to seventeenth embodiment are characterized by that the second adhered surface B is composed with only the plate materials (base 63, wind frame 68 or base 63 and wind frame 68) which is the most protruding from the side surface 62y.

According to the fourteenth embodiment to seventeenth embodiment as above described, the base 63, because the sealing glass 66 and the wind frame 68 can be appropriately selected as adhering surface in compliance with a shape of side surface of the CerDIP type solid state image input unit 62, the CerDIP type solid state image input unit having a cost merit can be utilized.

More further by means that hardening shrinkage force applied to the intermediate holding member 23 is transformed to a movement to come nearer (a slide) to the solid state image input unit 62 and the holding member of solid state image input unit with regard to an effect of hardening shrinkage of adhesive material which occurs at a fixing (at hardening of the adhesive material), the positional discrepancy at the CerDIP type solid state image input unit itself can be suppressed and the CerDIP type solid state image input unit 62 can be located with high accuracy in relation to the solid state image input unit holding member.

More further, by means of utilizing the intermediate holding member 23, because it can avoid to the utmost to employ the complicated structural parts (arrowheads, balls and springs), the structure does not need expensive material to save cost.

More further, because three degree of freedom can be given in three direction X, Z and β by means of sliding adjustment on the first adhered surface A and similarly it gives further three degree of freedom can be given in three direction X, Y and γ on the second adhered surface B, the positioning adjustment can be achieved by micro movement along five directions of X, Y, Z, β and γ in total structure.

By the way, the present invention is not restricted to the above described embodiments. For example in the above described embodiments material of ceramics is utilized for the base 63 and the wind frame 68, however, other materials such as epoxy resin, silicon resin of plastics and so on can be employed. In other words, various variations can be introduced without departing the scope and spirits of the present invention.

Hereinafter the effect of the present invention will be described.

In accordance with the first aspect of present invention the positioning adjustment in direction along only five areas of X, Y, Z, β and γ can easily be adjusted so that the positioning adjustment along the X axis is not achieved in positive manner.

After the positioning adjustment along five axes is completed the mounting of the second member is performed with high precision and yield of the process can get higher by means that thickness of the adhesive materials which are applied to the adhered surface between the second member and the intermediate holding member and the adhered surface between the first member and the intermediate holding member are controlled in the minimum requirement and constant value, and a positional accuracy of the adhered portions of second member and the first member do not have to be strictly controlled because the intermediate holding member is equipped between the second member and the first member, and at the same time, it can be prevented that an occurrence of deterioration in a fixing forth of the second member after the second member has been completed (after the adhesive material is hardened).

In accordance with the second aspect of present invention, even when defective at adhesion occurs on the first adhered surface or the second adhered surface, or both of these, the CCD circuit board including the solid state image input unit can be removed from the detachable supporting member and the solid state image input unit can be reutilized.

In accordance with the third aspect of present invention, even when defective at adhesion occurs on the first adhered surface or the second adhered surface, or both of these, the second member can be removed from the detachable supporting member and the second member can be reutilized.

In accordance with the fourth and the fifth aspect of present invention in the positioning adjustment for the second adhered surface the accurate positioning adjustment can be achieved when positioning adjustment of longer distance is required than a thickness of the solid state image input unit and a width of space between the solid state image input unit and the circuit board on which the solid state image input unit is mounted, because a longer adjustment space can be secured in Z direction by means that the second adhered surface is extending in direction of Z axis.

In accordance with the sixth aspect of present invention when the positioning adjustment cannot be completed by only a positioning adjustment of the solid site image input unit, the accurate positioning adjustment can be achieved because a distance adjustment between the frame and the pixel line of the solid state image input unit can be achieved in Z direction.

In accordance with the seventh aspect of present invention, the positioning adjustment with high accuracy, the positioning adjustment along the five axes and the advantage in layout can be attained.

In accordance with the eighth aspect of present invention the structure can be much stronger to the external force and the mechanical vibration than a structure with the same number of intermediate holding member which are located all the same side.

In accordance with the ninth aspect of present invention the accuracy of solid state image input unit can be kept in high level and mounting with high accuracy are realized because an image of chart illuminated by a light source can be focused on the solid state image input unit through the image forming lens unit, and calculate a position of the second firing portion based on the image data, a position of the solid state image input unit in Z direction can be adjusted by the second fixing portion even when relative positional discrepancy which is caused by the fluctuation of conjugate length, between the fame and the solid state image input unit happens.

What is claimed is:

1. A member mounting structure comprising:
    a first member on which an image forming lens unit having an optical axis is mounted;
    a second member on which a plurality of acting members are disposed along a straight line direction at a right angle to the optical axis to effect a predetermined operation relative to an image projected thereon by said image forming lens unit;
    an intermediate holding member configured to hold and align said first member with said second member for straight line image protection from the image forming lens unit to the second member along said optical axis;
    a first adhesive surface provided between said first member and said intermediate holding member configured to adhesively fix the first member and said intermediate holding member together; and
    a second adhesive surface provided between said second member and said intermediate holding member configured to adhesively fix the second member and said intermediate holding member together, wherein
    said intermediate holding member is disposed so that said first adhesive surface between said first member and said intermediate holding member, and said second adhesive surface between said second member and said intermediate holding member are arranged to have a part thereof extend along the straight line direction and said first adhesive material surface and second adhesive material surfaces are also arranged so that each have surface planes that are perpendicular to one another.

2. The member mounting structure according to claim 1, wherein said second member comprises a disposing member on which said acting members are disposed, a substrate on which said disposing member is mounted, and a supporting member configured to detachably support said substrate.

3. The member mounting structure according to claim 1, wherein said second member comprises a disposing member on which said acting members are disposed, and a supporting member configured to detachably support said disposing member.

4. The member mounting structure according to claim 1, wherein said structure further comprises a substrate on which said second member is mounted, said substrate including a through hole penetrated by a part of said intermediate holding member when said second member is fixed on said intermediate holding member.

5. The member mounting structure according to claim 1, wherein said structure further comprises a substrate on which said second member is mounted, said second member being arranged so that said substrate does not abut on a part of said intermediate holding member when said second member is moved in a direction toward said first adhesive surface to be fixed on said intermediate holding member.

6. The member mounting structure according to claim 1, wherein said first member has an adjusting member to adjust a distance between opposing surfaces of said first member and said second member.

7. The member mounting structure according to claim 1, wherein said first adhesive surface is positioned so that the surface plane thereof is perpendicular to the optical axis and without the optical axis crossing through a central part of the first adhesive surface.

8. The member mounting structure according to claim 1, wherein a plurality of said intermediate holding member are provided and at least a pair of said intermediate holding members hold together said second member.

* * * * *